(12) United States Patent
Schwantes et al.

(10) Patent No.: US 7,722,939 B2
(45) Date of Patent: May 25, 2010

(54) ADHESIVELY SECURABLE STOCK MATERIALS

(75) Inventors: Todd Arlin Schwantes, Lena, WI (US); Michael Curley Krzoska, Little Chute, WI (US); Gregory Stephen Kulibert, Oshkosh, WI (US); Adam Gregg Malofsky, Loveland, OH (US); Bernard Miles Malofsky, Bloomfield, CT (US); Nagib Maurice Ward, Appleton, WI (US)

(73) Assignee: Appleton Papers, Inc., Appleton, WI (US)

( * ) Notice: Subject to any disclaimer, the term of this patent is extended or adjusted under 35 U.S.C. 154(b) by 1057 days.

(21) Appl. No.: 11/364,730

(22) Filed: Feb. 28, 2006

(65) Prior Publication Data

US 2006/0240257 A1  Oct. 26, 2006

Related U.S. Application Data

(63) Continuation-in-part of application No. 11/216,516, filed on Aug. 31, 2005.

(60) Provisional application No. 60/665,134, filed on Mar. 25, 2005, provisional application No. 60/692,008, filed on Jun. 17, 2005.

(51) Int. Cl.
*B32B 33/00* (2006.01)
*B32B 5/16* (2006.01)
*B01J 13/02* (2006.01)
*B05D 1/12* (2006.01)

(52) U.S. Cl. .............. 428/40.2; 428/40.1; 428/402.2; 428/98; 428/99; 264/4.7; 427/180

(58) Field of Classification Search .... 428/402–402.24, 428/40.1, 40.2, 98, 99; 264/4–4.7; 427/180
See application file for complete search history.

(56) References Cited

U.S. PATENT DOCUMENTS

| | | | |
|---|---|---|---|
| 2,506,056 A | 5/1950 | Bergstein | |
| 2,907,682 A | 10/1959 | Eichel | |
| 3,489,599 A | 1/1970 | Krieble | 117/132 |
| 3,663,269 A | 5/1972 | Fischer et al. | 117/76 A |
| 3,814,156 A | 6/1974 | Bachmann et al. | 151/14.5 |
| 3,826,756 A | 7/1974 | Bachmann et al. | 252/316 |
| 3,866,873 A | 2/1975 | Bohli | 248/205 A |
| 4,094,222 A | 6/1978 | Lang et al. | 85/63 |
| 4,100,954 A | 7/1978 | Muller et al. | 151/41.7 |
| 4,137,194 A | 1/1979 | MCcune et al. | |
| 4,249,978 A | 2/1981 | Baker | 156/291 |
| 4,273,827 A | 6/1981 | Sweeney et al. | 428/307 |
| 4,325,985 A * | 4/1982 | Wallace | 427/520 |
| 4,362,566 A | 12/1982 | Hinterwaldner | 106/85 |
| 4,555,206 A | 11/1985 | Sweeney | 411/23 |
| 4,497,916 A | 2/1986 | Cooke et al. | 523/176 |
| 4,632,944 A | 12/1986 | Thompson | 522/11 |
| 4,693,652 A | 9/1987 | Sweeney | 411/23 |
| 4,867,817 A | 9/1989 | Kneafsey et al. | 156/73.1 |
| 4,886,579 A | 12/1989 | Clark et al. | 162/111 |
| 4,961,811 A | 10/1990 | Haugwitz | 156/344 |
| 5,397,812 A | 3/1995 | Usami et al. | 522/13 |
| 5,794,409 A | 8/1998 | Akridge et al. | 53/460 |
| 5,965,866 A | 10/1999 | Mederski | 235/429 |
| 6,084,010 A | 7/2000 | Baetzold et al. | 523/210 |
| 6,113,728 A | 9/2000 | Tsukagoshi et al. | |
| 6,126,872 A | 10/2000 | Kommareddi et al. | 264/4.1 |
| 6,375,872 B1 | 4/2002 | Chao | 264/4.33 |
| 6,407,225 B1 | 6/2002 | Mang et al. | |
| 6,451,927 B1 | 9/2002 | Haas et al. | 525/426 |
| 6,592,990 B2 | 7/2003 | Schwantes | 428/402.21 |
| 7,496,263 B2 * | 2/2009 | Xie et al. | 385/129 |
| 2002/0134499 A1 | 9/2002 | Wells et al. | 156/277 |
| 2002/0134500 A1 | 9/2002 | Wells et al. | 156/277 |
| 2004/0045666 A1 | 3/2004 | Gong et al. | 156/334 |
| 2004/0163754 A1 | 8/2004 | Nowicki et al. | 156/73.1 |
| 2004/0164134 A1 | 8/2004 | Gong et al. | 229/132 |
| 2004/0166257 A1 | 8/2004 | Pierce et al. | 428/34.1 |

FOREIGN PATENT DOCUMENTS

JP  09238821  7/1997

* cited by examiner

*Primary Examiner*—James Seidleck
*Assistant Examiner*—Saira Haider
(74) *Attorney, Agent, or Firm*—IP & L Solutions; Edward K. Welch, II

(57) ABSTRACT

Stock materials for manual and/or high speed industrial automated bonding applications having a curable pre-applied adhesive or sealant compositions on the bonding surfaces wherein the curative for the pre-applied adhesive or sealant composition is contained within a carrier which prevents its premature release.

40 Claims, No Drawings ns. The types of chemistries include epoxies, urethanes, acrylic esters, vinyl esters, polyesters, polyvinylacetates, etc. Their physical state may be that of a water-like liquid, a viscous flowable or non-flowable material, a solid or semi-solid form, etc. Water-like liquid forms may comprise one or more liquid curable or polymerizable monomers, oligomers and/or prepolymers or a solid or semi-solid material that is dissolved in an appropriate solvent. Viscous forms may be highly thickened compositions; particularly those liquid systems that further contain thixotropic agents or other thickening fillers and polymeric materials. Solid and semi-solid compositions include temperature sensitive materials, such as hot melts and reactivatable adhesives, as well as materials that, due to their inherent characteristics or the presence of tackifiers and/or plasticizers, are sticky in nature, such as pressure sensitive adhesives.

ADHESIVELY SECURABLE STOCK MATERIALS

This application is a Continuation-in-Part application of pending U.S. patent application Ser. No. 11/216,516, filed Aug. 31, 2005, entitled "Encapsulated Cure Systems", the contents of which are hereby incorporated by reference, and claims the benefit of the following US Provisional applications: 60/665,134 filed Mar. 25, 2005 and 60/692,008 filed Jun. 17, 2005, the contents of which are also hereby incorporated herein by reference.

BACKGROUND OF THE INVENTION

1. Field of the Invention

The present invention is directed to adhesively securable and/or matingly sealable stock materials having a pre-applied, encapsulated adhesive or sealant composition wherein the pre-applied, encapsulated adhesive and sealant composition resist premature activation, even with the application of pressures typical for fracturing traditional encapsulated adhesives and sealants. In particular, the present invention is directed to stock materials having applied thereto a pre-applied encapsulated, liquid adhesive or sealant composition wherein at least one curative ingredient necessary for effectuating polymerization or cure of the adhesive or sealant composition is contained within a non-liquid, non-flowing carrier material that is encapsulated. In a preferred embodiment, the present invention is directed to stock materials having threaded elements for fastening including fasteners, conduits and finished stock materials to be assembled into a larger apparatus or assembly; utilized in retaining or blind hole bonding applications, and other stock materials having a planar surface for bonding applications as well as stock packaging materials, especially paperboard packages and containers.

2. Description of Related Art

Adhesive and sealant compositions are available in a seemingly endless variety of chemistries, forms (whether as a state of being or physical construct) and mechanisms of cure or polymerization. The types of chemistries include epoxies, urethanes, acrylic esters, vinyl esters, polyesters, polyvinylacetates, etc. Their physical state may be that of a water-like liquid, a viscous flowable or non-flowable material, a solid or semi-solid form, etc. Water-like liquid forms may comprise one or more liquid curable or polymerizable monomers, oligomers and/or prepolymers or a solid or semi-solid material that is dissolved in an appropriate solvent. Viscous forms may be highly thickened compositions; particularly those liquid systems that further contain thixotropic agents or other thickening fillers and polymeric materials. Solid and semi-solid compositions include temperature sensitive materials, such as hot melts and reactivatable adhesives, as well as materials that, due to their inherent characteristics or the presence of tackifiers and/or plasticizers, are sticky in nature, such as pressure sensitive adhesives.

Curable adhesive and sealant compositions also vary widely in their physical construct. They may exist as true one-part systems where all components necessary for effectuating the bond or seal are present in the adhesive or sealant composition, e.g., anaerobic adhesive and sealants or solvent type adhesives and sealants. Alternatively, they exist as two- or more part systems wherein each part is kept separated or isolated from the other until time of use. These too take many forms. The simplest form, oftentimes employed with two-part epoxy systems, is that where semi-solid beads of each component are extruded in a side-by-side relationship, with or without a tape backing or support. A more complex form is that where a special packaging design is employed to keep the reactive components isolated from each other until the time of use, e.g., a dual barrel or a single barrel, dual compartment caulking-type tube, a mixer cup which has separate compartments which collapse to form a single compartment upon use or a self-contained packaging wherein both a crushable ampule (often glass) containing one component and the liquid curable component are contained in a single container which is made of a flexible material so as to allow for the crushing of the ampule and the kneading of the two components before dispensing. A particularly successful and desirable form of two- or more-part adhesives and sealants are those known as encapsulated adhesives and sealants wherein one or more curative components are isolated from the remaining components through encapsulation, more specifically microencapsulation.

The mechanism of cure or polymerization for the various adhesive and sealants vary widely as well. Solvent based adhesives and sealants are effectively "cured" upon evaporation of the solvent carrier. Monomeric, oligomeric and/or pre-polymeric adhesive and sealant systems may cure or polymerize through step growth polymerization and/or addition polymerization, especially free radical, cationic or anionic polymerization, each of which may be facilitated by or initiated chemically or by environmental conditions including heat and/or light. Other systems, especially prepolymeric and polymeric systems may cure through crosslinking with other monomers, oligomers and or prepolymers.

With such a variety of adhesive and sealant compositions, it is no wonder that they find broad use across a number of industries as well as in the construction and consumer markets. While there are so many different choices of adhesive and sealant chemistries, forms and mechanisms of cure or polymerization, no one is suitable for all applications. Each has attributes and characteristics, both of the uncured system and of the cured adhesive or sealant that will dictate where and when any given system or composition may be used. For example, solvent based adhesives are fine for making adhesive tapes, flooring bonding systems, wood glues and other consumer glues; however, such adhesive and sealant systems are not useful for most industrial assembly operations due to environmental and safety concerns with the solvents, especially organic solvents, nor for applications where speed of cure is important.

While many different adhesive and sealant compositions find utility in industrial manufacture and assembly operations, selection of the appropriate adhesive and sealant is particularly important. Although hot melt type adhesives probably account for the greatest volume of adhesives used in manufacturing, liquid curable adhesives and sealants have more applications and provide far greater versatility in industrial applications. The most common form of liquid curable adhesive and sealants used in industrial manufacture and assembly operations are the one-part systems. However, multi-part liquid adhesive and sealant compositions also find use; although these require the use of more sophisticated application means so that mixing occurs concurrent with dispensing. Since mixing typically initiates curing or polymerization, as appropriate, concern must also be given to the pot life or open times associated with such adhesive and sealant compositions, i.e., the period of time in which the adhesive or sealant is still workable. A short open time or pot life means that mating of the components must occur concurrent with or immediately following application of the adhesive or sealant. Further viscosity must also be properly addressed to ensure that the liquid adhesive and sealant materials do not run out of the bond interface and/or are capable of filling gaps often found with mated surfaces. While such one-part and two- or more part liquid adhesive and sealant compositions are broadly and successfully used in industrial manufacturing and assembly operations, their use is not without risk. Specifically, should an adhesive or sealant composition clog up the dispenser or, in the case of two- or more part systems, the mixing means improperly mix the components or fail to employ the proper mixing ratio of the components; it may be necessary to shut down the whole of the industrial assembly/manufacturing process until the problem is addressed. Additionally, whether or not the problem can be address on the run, i.e., while the process is still operating, all those substrates to which an improper adhesive or sealant has been applied will have to be scrapped or cleaned, if cleanable. Thus, there can be huge economic consequences should problems arise with the in-line use of hot melts as well as liquid adhesive and sealant compositions.

A second class of adhesives and sealants that have found use in industrial assembly and manufacturing processes are those known as pre-applied adhesives and sealants, i.e., those that are capable of being pre-applied to a substrate for later activation and use. Like liquid curable adhesives and sealants, pre-applied adhesives and sealants come in a number of chemistries and forms. The more common forms are the pressure sensitive adhesives and sealants, encased sealants and adhesives, encapsulated adhesive and sealants, and reactivatable adhesives and sealants. While each has their respective niche applications, they are not without their limitations and oftentimes one must compromise on performance and/or economics. Furthermore, they are not generally suited for use in high-speed industrial assembly operations, at least not without significant compromises or limitations.

Although pressure sensitive adhesives have found utility in a number of applications, including on stock materials, there are a number of limitations, both from a performance and utility standpoint. Generally, pressure sensitive materials do not provide the same bond strength or permanence as curable or polymerizable materials. This may not be a problem in certain applications, e.g., consumer envelopes; however, in applications requiring high bond strengths, it is an issue. Additionally, the use of pressure sensitive adhesives on stock materials requires added steps since a release paper or film must be applied over the pressure sensitive material to prevent pre-mature and/or unintended bonding and then removed prior to mating the surfaces to be bonded. These additional steps also necessitate added costs to the assembly operation in terms of materials, the release paper or film, and equipment needed to apply and remove the same. Though some pressure sensitive adhesives and sealants may be latently activatable, their activation means, e.g. heat or solvent, also limit their use as well as add costs.

Another form of adhesive and sealant compositions used in pre-applied applications are those wherein the adhesive or sealant composition or one or more components of the same are encased or encapsulated. Encased adhesives and sealants are those wherein a pool of a liquid curable or polymerizable composition is encased by a cured or polymerized film of the same or a second curable or polymerizable composition such that the liquid curable composition lies between the latter and the substrate to which it is applied. The encased systems are often anaerobic systems or heat activatable systems that incorporate a light activated component which, following application of the liquid curable or polymerizable composition to the substrate, are exposed to the appropriate light to effectuate a cure or polymerization of the top layer of the liquid composition thereby forming a skin on the surface of the liquid curable or polymerization composition. Alternatively, a liquid, film forming material, which may be curable, polymerizable or in solution, is sequentially applied as a separate over-layer to a substrate having a liquid polymerizable or curable adhesive or sealant composition already applied thereto and then exposed to conditions for effecting the cure or polymerization of the over-layer material so as to encase or skin over the first applied material. These type adhesive and sealant compositions are often found on threaded assemblies or more commonly in potting or encapsulating type applications, for example, of electronic components.

The most common form of pre-applied adhesive and sealant compositions are those known as the encapsulated or microencapsulated systems. Encapsulated systems typically comprise a plurality of microencapsulated curable or polymerizable adhesive or sealant components bound to the substrate by an appropriate binder composition. These systems may be of a single type of microcapsule wherein a curative necessary for effecting cure of the liquid curable or polymerizable composition is either entrained within or adhered to the microcapsule walls or is entrained in the binder and the liquid curable component contained in the microcapsules. Alternatively, there may be a plurality of microcapsules, each containing one or more components of the liquid curable or polymerizable composition provided that the ingredients necessary for initiating or effecting cure or polymerization are in separate microcapsules so that cure or polymerization is not effected until the microcapsules are broken and the contents thereof allowed to intermix and interact. Yet another microencapsulated adhesive or sealant system is that where the binder bonding the microcapsules to the substrate surface is actually the adhesive or sealant material and the microcapsules contain a solvent for the binder material. Upon rupture of the microcapsules, the solvent is released softening or dissolving the binder to allow for the mating of substrates and the solvent is subsequently absorbed into one or more of the substrates and/or evaporated off leaving the re-solidified adhesive or sealant.

Pre-applied encapsulated adhesives and sealants have utility in a number of applications, particularly in thread locking, snap fit and retaining applications where a threading action and/or interference fit provides the necessary action to fracture the microcapsules, thereby releasing and intermixing, as necessary, the components of the liquid curable adhesive or sealant composition. Such compositions and their applications are show in, for example, Wallace (U.S. Pat. No. 4,428,982), Müller et. al. (U.S. Pat. No. 4,100,954) Sweeney (U.S. Pat. Nos. 4,556,206 and 4,830,558), Rich et. al. (U.S. Pat. No. 5,853,520), Matsuo (U.S. Pat. No. 6,025,074), Bachmann et. al. (U.S. Pat. No. 3,814,156) and Bohli (U.S. Pat. No. 3,866,873).

They also find use in bonding or laminating flat sheets of one substrate to itself or another flat substrate where one or more pinch rollers, a stationary blade or other means, including finger pressure, compress the mated substrate surfaces with the pre-applied adhesive sandwiched in between whereby the compressive forces fracture the microcapsules and facilitate the intermixing of the components of the curable or polymerization compositions. For example, Akridge et. al. (U.S. Pat. No. 5,794,409) and Haugwitz (U.S. Pat. No. 4,961,811) teach paper bonding applications employing encapsulated adhesive compositions.

Although pre-applied adhesives and sealants have found broad commercial use, they are not without limitations and disadvantages. One of the key disadvantages or limitations of the encapsulated adhesive and sealant compositions lies in the fragility of the microcapsule walls. Consequently, the pre-application of such microencapsulated adhesives tend to be limited to those applications where there is little or limited opportunity for premature fracture of the shell wall. For example, where such materials are to be pre-applied to stock materials, storage and handling of the stock materials must be such that the areas to which the encapsulated adhesive or sealant is applied do not come in contact with each other, other substrates and/or are not subject to compressive forces. Stacking of stock materials, one on top of the other, may lead to premature fracturing of the microcapsules, thus leading to unwanted bonding of one stock material to another and, even if such bonding does not occur, consumes the liquid curable or polymerizable components in the ruptured microcapsules, leaving less, and oftentimes insufficient material for the ultimate bonding or sealing application. Similarly, when the microencapsulated adhesive is applied to small fasteners (e.g., screws, bolts, push pins and the like), because such products are often loosely packaged, they often bond to each other as a result of collisions between the products during packaging and handling.

Furthermore, in those automated assembly operations where a stock material having a pre-applied adhesive may come in contact with other substrates or the handling and assembling equipment, the potential exists for premature and unwanted bonding and/or consumption of liquid curable materials. In a high-speed assembly process, the last thing one wants is to have to shut down the assembly line to remove a bonded component. While such point contact bonded pieces may be readily parted, cured materials remain in the threads and/or on the surface of the substrate making proper threading or, in the case of an interference fit situation, insertion difficult, if not impossible. In other applications, such cured materials may act as a spacer between the substrates to be mated, thereby creating a gap where no gap is desired. Consequently, in each of these situations, it may be necessary to remove the cured materials before the item can be used.

Though a number of solutions exist for overcoming some of the foregoing difficulties and problems, they are not completely satisfactory or totally effective, if even practical. For example, while it is possible to individually package or to create special packaging that does not allow contact between the substrates carrying the pre-applied adhesives, such solutions are most often too expensive, particularly for high volume commodity applications such as small fasteners. Furthermore, besides the cost and need for materials and equipment to perform the proper packaging, such packaging may introduce the need for yet another apparatus in order to remove the particular substrate from the custom packaging for introduction into the assembly process. Similarly, special racks and/or spacer elements may be employed to keep stock materials from touching one another; however, again, costs are increased and production efficiencies may be adversely affected.

Problems with premature fracturing can also be mitigated or reduced by using thicker shell walls on the microcapsules and/or spacer particles; however, these have the disadvantage of increasing the amount of non-adhesive and non-sealing materials at the bond or seal interface. As more and more of the solid shell material is present or as solid particles are added to protect the weaker, microencapsulated liquid particles, there is less liquid curable component available to achieve the bond or seal for a given volume of the microencapsulated adhesive or sealant composition. Similarly, such "filler" materials will present additional problems in that they serve as a spacer between the substrates, even if no gap is present or desired. Additionally, in retaining and interference fit situations, e.g., the insertion of a pin into a cylindrical recess, the presence of such "filler" particles may prevent proper fitting of the substrates or cause the liquid curable adhesive or sealant material to be scraped off the one substrate as it is being inserted into the other. Consequently, in each of these circumstances, one may end up with weak bonds and/or poor seals.

Another limitation on the use of conventional pre-applied microencapsulated adhesive and sealant compositions in industrial applications relates to the viscosity of the encapsulated compositions, especially prior to cure or polymerization. Once the microcapsules containing the liquid components are ruptured, the liquid quickly runs across the surface. The tendency is for the same to form a monolayer except where capillary forces keep thicker amounts between substrates and/or the fractured shell materials. While this may not be a problem with applications where two substrates are to be mated concurrent with rupturing of the microcapsules, care must be given to ensure that too much run out or squeeze out does not occur, particularly where a gap may be present, e.g., where one or both substrates to be mated have an uneven surface and/or a flex which manifests itself once the rupturing forces are removed and the substrates relax to their normal position.

As noted above, pre-applied adhesives and sealants have found utility in a number of stock material applications; however, their use is limited due to the constraints of activation and, perhaps more commonly, the physical and/or performance characteristics of the typical pre-applied adhesives. In the latter case, due to poor or incomplete activation and/or availability of the curable components, pre-applied adhesives and sealants oftentimes manifest poor bond/seal strengths. Additionally, due to the constraints on encapsulating high viscosity materials, pre-applied adhesives tend to be of low viscosity, such that they may readily run out of or, during assembly and/or activation, are pressed or squeezed out of the bond interface. Furthermore, with concerns of capsule fragility and pre-mature breakage, the amounts of activators and catalyst and other cure speed enhancers are limited to prevent premature curing.

In order to overcome many of the shortcomings and problems associated with pre-applied encapsulated adhesives and sealants as well as other types of adhesives, particularly hot melt adhesives, on stock materials for use in industrial assembly operations, the industry has turned its attention away from hot melts and encapsulated adhesive and to what are typically referred to as reactivatable adhesives. These reactivatable adhesives, though "cured" in place on the stock material, can be reactivated upon exposure to sufficient energies of various types, especially ultrasound or near infrared radiation (NIR). Such materials and their use on stock materials are disclosed in, e.g., Gong et. al. (US 2003/0041963 A1; US 2004/0164134 A1; US 2004/0164135 A1 and US 2004/0166309 A1); Nowicki et. al. (US 2004/0163754 A1; US 2004/0163768 A1 US 2004/0166238 A1;) and Pierce et. al. (US 2004/0166257 A1). These materials, however, are limited in chemistries and, thus, applications. More problematic is the fact that they introduce a number of new problems, particularly health and safety problems. Specifically, these materials require specialized equipment not only for generating the NIR and ultrasound energies but also in protecting the workers and workplace from the energies so produced.

Thus, while conventional pre-applied adhesives have found considerable use in the manufacture of certain stock materials, their use is limited and not without its detractions. It would be desirable, therefore, to provide stock materials having a pre-applied adhesive wherein concerns relative to premature fracturing of the microencapsulated adhesive is greatly reduced, if not overcome. Similarly, it would be desirable to provide stock materials where concerns of premature bonding due to point contact or rough handling during processing, transportation and/or use is greatly reduced if not overcome. Furthermore, it would be desirable to expand the realm of stock materials to which pre-applied adhesive and sealant compositions could be applied, especially for high-speed assembly and manufacturing processes. In following, it would be desirable to provide pre-applied adhesive and sealant compositions whose cure speeds are immediate or close thereto. It would also be desirable to provide high-speed industrial assembly and manufacturing processes wherein the dispensing and application of liquid or flowable adhesives can be avoided. Finally, it would be desirable to provide a high-speed process by which a curable pre-applied adhesive or sealant composition on a stock material, which overcomes the aforementioned problems and issues, is activated quickly and with minimal complexity so as to be amenable for use in high-speed assembly and manufacturing processes.

SUMMARY OF THE INVENTION

According to the present invention there are provided stock materials wherein at least one surface thereof, or portion of said surface or surfaces, has applied thereto a dry-to-the-touch, encapsulated, liquid, curable adhesive or sealant composition, said encapsulated composition comprising an encapsulated liquid curable or polymerizable component and a separately encapsulated curative complex, said curative complex comprising at least one curative capable of effecting, directly or indirectly, the cure or polymerization of the aforementioned liquid curable or polymerizable component and being substantially non-flowing in the absence of external forces or conditions impacting upon said curative complex. More specifically, the present invention relates to such stock materials wherein said encapsulated liquid curable or polymerizable component comprises a liquid curable monomer, oligomer and/or prepolymer and said encapsulated curative complex comprises the aforementioned curative contained in a carrier material, the physical properties of which account for the substantially non-flowing characteristic of the curative complex. The carrier is typically a natural or synthetic material or composition that is (a) soft, putty-like or gel-like in character or (b) a solid or semi-solid that is (i) soluble in or is softened by a liquid curable matrix component of the curable composition with which they are to be used, (ii) softened by the reaction and/or environmental conditions under which the curable composition is cured or polymerized or (iii) is softened by the method or process by which the curative is to be made available to the curable, polymerizable or cross-linkable component of said adhesive or sealant.

The curative or curatives, if more than one is present in the carrier, may be any of a number of materials known for effectuating, directly or indirectly, the cure or polymerization of the curable component(s). These curatives may be liquid, solid or semi-solid materials that are dispersed as a discrete phase in the carrier or are wholly or partly soluble in or miscible with the carrier. Alternatively, the curative may be combined with one or more of the precursor or starting materials from which the carrier is formed in which case it is incorporated into the carrier concurrent with the formation thereof. The present invention is applicable to any type of curable or polymerizable adhesive or sealant composition which is capable of being encapsulated, including traditional one-part as well as two-or more part liquid curable compositions.

The present invention may be applied to most any type of stock material that is to be adhered or sealed in a subsequent assembly or manufacturing operation. The one limitation on the applicability of stock materials is that the surface to which the pre-applied adhesive or sealant of the present invention is applied must undergo sufficient shear forces during the assembly process or must be able to be activated by an activator means sufficient to create sufficient shear forces which shear force must be sufficient to not only fracture the microcapsules but also provide adequate shear and kneading or mixing of the carrier to expose the therein contained curative to the remainder of the curable or polymerizable composition to effectuate cure or polymerization thereof.

In one embodiment of the present invention, the stock materials are plastic or metal threaded elements, e.g., pipe ends, pipe end caps, pipe connectors, screws, bolts, nuts and the like, wherein the dry-to-the-touch adhesive or sealant materials is pre-applied to the threaded elements thereof. Here the liquid curable component and the curative component may be in separate microcapsules that are held to the surface of the threaded elements by a binder material or the microcapsules containing the curative may be dispersed within the liquid curable composition and the mixture itself encapsulated onto the threaded element.

In another embodiment of the present invention the stock materials are plastic or metal components employed in retaining or blind hole bonding applications including, for example, shafts, dowels, rotors, sprockets, hubs and bearings wherein the pre-applied adhesive is applied to the portion of the shaft or dowel to be bonded or, preferably, contained within the bore or blind hole of the element to be bonded.

The present invention is also applicable to any number of applications wherein components are to be integrated into a larger assembly and either their mechanism for attachment allows for sufficient shear to activate the pre-applied adhesive or the surface on which the curable adhesive is pre-applied is accessible to be activated manually or by automation prior to mating. For example, such stock materials may include magnets used in the manufacture of electric motors or speakers, motor mounts, trim panels and housing panels.

In yet another embodiment, the stock materials are paper, paperboard, cardboard and other cellulose-based stock materials used in the construction of packaging and containers including cartons, boxes, cases, trays, bags, envelopes, mailers, tubes, cups, and the like and wherein the pre-applied adhesive is applied in a pattern suitable for formation of desired end product. Their application here is especially unique owing to the tendency of liquid adhesives to wick into or be absorbed by paper and cellulosic material.

The present invention is also directed to the method of activating the pre-applied adhesive and sealant compositions applied to the stock materials. In particular, it is directed to the activation of said pre-applied adhesives and sealants in a high-speed industrial assembly or manufacturing process.

Finally, in following, the present invention is also directed to the use of stock materials made in accordance with the present invention in high-speed industrial assembly or manufacturing processes. While the stock materials of the present invention are certainly useful in manual assembly and manufacturing processes, they are especially adapted for use in high-speed, high volume industrial assembly and manufacturing operations. Such operations may be of the discontinuous type where the assembly line stops and goes as each component is sequentially added at each successive workstation; of the continuous type where there is no pause or delay in the progression of the assembly during the assembly or manufacturing process or a hybrid which has sequences of both type of operations.

DETAILED DESCRIPTION

Generally speaking, the present invention is directed to stock materials having a dry-to-the-touch, encapsulated, liquid curable or polymerizable adhesive or sealant composition pre-applied to at least one surface thereof or portion of said surface or surfaces wherein the pre-applied adhesive or sealant composition comprises an encapsulated liquid curable material and a separately encapsulated curative complex, said curative complex comprising at least one curative capable of effecting, directly or indirectly, the cure of the aforementioned liquid curable material and being substantially non-flowing in the absence of external physical and/or environmental forces or conditions.

In one embodiment, the pre-applied adhesive or sealant composition comprises microcapsules of the curative complex dispersed in the liquid curable material and the combination itself either contained within a microcapsule or, more preferably, entombed or encased on a surface of the stock material by a thin film of a cured in place curable material, which curable material may be the same or a different curable material from the liquid curable material of the pre-applied adhesive.

Preferably, the pre-applied adhesive or sealant composition comprises a mixture of at least two different types of microcapsules, one of which comprises an encapsulated liquid curable or polymerizable component and the other the encapsulated curative complex, wherein the microcapsules are physically mixed but not within one another.

The unique character of the pre-applied adhesives and sealants employed in the practice of the present invention (a) allows for their use on a much a broader class of stock materials than have been successfully used to date, (b) enables and/or motivates one to expand the choice of adhesive and sealant compositions which may be used in a pre-applied application, (c) addresses and overcomes many of the shortfalls associated with the use of traditional pre-applied encapsulated adhesive and sealant compositions in stock material applications, (d) addresses and overcome many of the issues and adverse consequences oftentimes found with the in-line application of adhesives and sealants during assembly or manufacturing operations, especially high speed operations and (e) expands the type and number of high speed assembly and manufacturing operations in which pre-applied adhesives may be used.

As used herein the terms "stock material" and "stock materials" are meant to include finished and semi-finished goods or articles of manufacture that are stored or capable of being stored prior to use in their end-use application and which, in the case of the instant application, are intended to be or are capable of being bonded or sealed with a liquid adhesive or sealant composition to another substrate or to itself in such end-use application. For example, magnets are often bonded in the manufacture of electric motors and speakers. Similarly, paperboard stock is bonded to itself in the manufacture of cartons and other boxes.

Stock materials within the scope of the present invention include those whose bonding surface or interface is capable of having a pre-applied adhesive or sealant applied thereto which pre-applied adhesive or sealant is subject to or capable of being subject to high shear and/or mixing forces sufficient to activate the novel adhesive systems during assembly or immediately prior thereto. Said high shear or mixing forces may result from the assembly process itself or may be generated by an activation means; however, simple press fit or pressure application, as with a roller or stationary activator blade or the running of a fingernail or coin over the bond interface, as oftentimes found with traditional pre-applied adhesives, will not be sufficient to provide adequate bond or seal strength with the novel adhesives and sealants employed in the instant application. Thus, in the preferred embodiments, except for threaded assemblies, the stock materials will be subjected to an activator means which is capable of applying sufficient shearing and mixing forces to the pre-applied adhesive or sealant composition. In the case of stock materials that are to be assembled by a threading action, it will be necessary that the assembly process involve multiple turns or repeated partial turns (i.e., repeated twist and untwist actions) of the stock material to ensure sufficient activation is attained. Merely rotating a threaded assembly 90° one time will not provide sufficient shear and mixing to sufficiently activate the adhesive and sealants employed.

The present invention is particularly suited to stock materials whose bonding surface is unobstructed and substantially planar, most especially those stock materials whose entire face or surface upon which the adhesive or sealant is to be applied is substantially planar. In this regard, since the present invention is particularly directed to stock materials to be employed in high speed industrial assembly and manufacturing operations, especially continuous operations, the use of stock materials whose bonding surface is unobstructed, i.e., is readily accessible to the means by which the adhesive material is activated, particularly as the stock material traverses the assembly line, is especially desirable.

Of course, stock materials having an obstructed surface, i.e., those whose structure is such that they would not allow for the continuous traversing of the stock materials past the activation means, may be used as well. Here, the activator means would have to be attached to a robotic arm that places the activation means at the site of activation and then retracts the same following activation. Absent the use of complex and expensive machinery and apparatus, this process would likely require a pause in the advancement of the assembly line, or at least in the activation station, to allow the robotic arm to extend and retract for each piece of stock material as it traverses through the activation station of the assembly line. Unless there were multiple activation stations with staggered activation operations, each of which delivers the activated stock material to the assembly line, this would result in slower through put than a continuous system.

As noted above, the bond surface of these stock materials, i.e., the surface upon which the adhesive or sealant is pre-applied and which is to form the bond interface, is to be substantially planar to facilitate activation. In those instances where the stock material as a whole is not substantially planar, the substantially planar surface may comprise a flange or flange-like structure that forms a part of, is integrated into, or is attached to the stock material. Because the activated adhesive and sealant compositions employed in the practice of the present invention have higher, preferably substantially higher, viscosity than found with traditional liquid curable pre-applied adhesives and sealants following their activation, concern for the adhesive leaking out of gaps or into crevices or voids caused by ridges, peaks, undulations, and/or other surface imperfections on the bond surface or failing to fill the gap or void between opposing surfaces at the bond interface is less of a concern. Thus, by use of the term "substantially planar" we are referring to surfaces that are truly planar as well as those having minor imperfections or variations in the surface or which have an intentional surface texture, e.g., a rugose or etched surface.

Generally speaking, such surface imperfections or variations may be such that gaps or voids on the order of up to 2 mm, preferably no more than about 1 mm, more preferably no more than about 0.5 mm, and most preferably no more than about 0.26 mm exist between the opposing faces of the bond surfaces once they are mated. Thus, because the critical factor is the gap or void, it is allowed that substantially planar surfaces whose overall contour is non-planar, e.g., flanges or surfaces having an intentionally undulating or wavy contour, may be employed so long as the bond surface to which it is to be mated has a corresponding contour or surface characteristic.

The material make-up or composition of the stock material is not critical; however, attention must be given to selecting appropriate adhesive systems for the stock material and, if applicable, the substrate to which it is to be bonded. Improper selection of the adhesive system and/or improper preparation of the surface(s) of the stock material and/or the substrate, if applicable, may lead to poor or failed bonds. Thus, the stock materials may be made of metals, wood, paper, plastics and the like. Those skilled in the art will readily recognize and select appropriate adhesive systems for the given stock material and/or substrate as well as the proper surface preparations needed, if any, including cleaning, etching and/or priming.

As noted above, the stock materials to which the pre-applied adhesive may be applied in accordance with the practice of the present invention vary widely. The present invention is especially applicable to threaded elements wherein the pre-applied curable adhesive or sealant composition covers at least a portion of the threaded surface or surfaces, especially fasteners such as screws, bolts, nuts, eyehooks, eyebolts, wing nuts and the like. Alternatively, the threaded elements may form a part of or be associated with conduit means, including, for example, pipes, tubes, end caps, spigots, valves, connectors and the like. Alternatively, the threaded element may merely be a part of or associated with finished or semi-finished assemblies or devices and serve as a means to attach the same to a larger assembly or a supporting structure or frame. For example, such finished and semi-finished stock materials include solenoids, filters, valves, pressure gauges, sensors and the like.

Yet another class of stock materials to which the present invention is applicable includes those stock materials, including finished and semi-finished assemblies or devices that are employed in retaining or blind hole bonding applications. These applications typically involve stock materials having a) one or more pistons or male connectors which, in the assembly process, are inserted into or through offsetting blind holes or keyways of a female connector of another substrate, b) one or more blind holes, keyways or other female connectors which, in the assembly process, receive a piston or male connector of anther substrate, or c) one or more male and female connectors. Here the pre-applied adhesive or sealant may be within the blind hole or keyway of the female connector or applied to that portion of the piston of the male connector that, in the assembled state, is bonded to the female connector. Exemplary of these stock materials there may be given, shafts, dowels, engine core plugs, press-fit caps, rotors, sprockets, hubs, bearings, and the like. Depending upon the extent of relative movement between the two parts during the retaining or blind hole bonding application, it may be necessary to add additional movement, other than the mere insertion step, in order to ensure good release and availability of the curative in the carrier.

The present invention is also applicable to any number of applications wherein components are to be integrated into a larger assembly and either their mechanism for attachment allows for sufficient shear to activate the pre-applied adhesive or the surface on which the curable adhesive composition has been pre-applied is accessible to be activated manually or by automation prior to mating. For example, such stock materials may include magnets used in the manufacture of electric motors or speakers, motor mounts, trim panels and housing panels. As discussed elsewhere, mere mating of the parts to be assembled is not likely to be sufficient to ensure proper activation of the curable composition; therefore, there is preferably a manual or automated activation of the liquid curable composition before the two parts are mated.

As disclosed in greater detail in co-filed U.S. patent application of Schwantes et. al. entitled "Stock Packaging Materials" which is hereby incorporated herein by reference and which claims the benefit of U.S. Provisional Application No. 60/692,008 filed Jun. 17, 2005, the present invention is also suited for use where the stock materials are those used in packaging or containers including cartons, boxes, cases, trays, bags, envelopes, mailers, tubes, cups, and the like. Owing to the unique factors and difficulties relating to and encountered in the production and use of such packaging stock materials, particularly those having a pre-applied adhesive, that aspect of the most general scope of the present invention is dealt with individually in the aforementioned application. Suffice it to say, for the purpose of this application, that packaging stock materials may be comprised of paper, paperboard, corrugated paperboard, chipboard, boxboard, cardboard, paperboard laminates, multi-ply paperboard and the like and may have applied thereto one or more coatings. Most often such stock materials are comprised of cellulosic materials but may also be comprised of or include, in addition to the cellulosic materials, synthetic materials such as polyesters, polypropylenes, polyethylenes, and polyamides (particularly nylons), especially synthetic fibers of the foregoing, as well as chemically modified cellulosics, especially fibers thereof, such as rayon and cellulose acetate. Typically, paperboard laminates have one or more layers of a thermoplastic coating on one or both sides of the paperboard stock. Of course, the use of coatings is not limited to paperboard and any of the aforementioned stock materials for packaging may have the same or similar thermoplastic coating layers applied thereto and/or comprise a composite of the stock material with thermoplastic polymer films, such as polyethylene, polypropylene, Mylar, polyvinylidene chloride, ethylene vinyl acetate and the like and/or foils, especially aluminum foil. Finally, such stock materials may also comprise other coatings including thermoset coatings, varnishes, clays and the like. All of such materials, coatings and the like are well known to those skilled in the art.

The pre-applied adhesives and sealants to be employed in the practice of the present invention vary widely and, essentially, include any of the known liquid curable adhesive or sealant compositions provided that the same are capable of being microencapsulated. Certainly, to the extent such compositions have previously been employed in forming encapsulated adhesives or sealants, they can be adapted for use in the practice of the present invention. However, even liquid curable adhesive and sealant compositions not traditionally used in an encapsulated system may also be adapted for use in the practice of the present invention. For example, adhesive and sealant compositions that involve constituents, additives, curatives or the like that resulted in undesired interactions with or incompatibility with the encapsulating materials or process may, in many instances, now be used with little, if any, adverse consequence. Here the carrier serves to isolate the one from the other and whatever amount of material that may be exposed at the carrier surface is unlikely to be sufficient to adversely disrupt or affect encapsulation.

Similarly, traditional one-part liquid adhesive and sealant compositions may be readily adapted to the preparation of a two-part pre-applied encapsulated composition in accordance with the teaching of the present invention. For example, one-part liquid adhesive and sealant compositions that cure or polymerize upon exposure to heat, light, the absence or oxygen or the like may now be used in a pre-applied application by isolating at least one of the critical curatives from the remainder of the composition. This isolation of the curative from the remainder of the composition means that even if an incidental exposure of the stock material with the encapsulated adhesive or sealant pre-applied thereto to conditions which would otherwise initiate or effectuate cure or polymerization of the one-part adhesive or sealant composition were to occur, no curing or polymerization would take place.

As is evident, the practice of the present invention is applicable to a broad array of adhesive and sealant compositions. Exemplary of the adhesive and sealant compositions suitable for use in the practice of the present invention are those described in pending United States patent application Ser. Nos. 11/216,516 60/606,720, of Schwantes et. al., filed on Aug. 31, 2005 and claiming priority from U.S. Provisional Application Nos. 60/606,720 filed Sep. 1, 2004; 60/665,134 filed Mar. 25, 2005 and 60/692,008 filed Jun. 17, 2005, all of which are incorporated herein by reference.

Selection of the specific adhesive or sealant composition to be used with any given stock material depends upon a number of factors including, but not limited to, (a) the stock material itself and its end-use application, (b) the mechanism by which the adhesive or sealant is to be cured or polymerized and the compatibility of the same with the activation means, assembly process in which they are to be employed, and the like, (c) the process or method by which the curative is to be made available to the remainder of the curable composition, (d) the selection of the carrier and the compatibility of the same with the curative, the remainder of the curable compositions, the activation method, etc. Those skilled in the adhesive and sealant art will readily recognize other factors to consider in selecting the appropriate curable composition for the intended application.

For convenience, unless otherwise stated or as is obvious from the context in which it is employed, as used herein and the appended claims, the terms "curable composition" and "curable compositions" shall mean all such curable, polymerizable and/or cross-linkable liquid adhesive and sealant compositions. In the same light, unless the context of the text or claim makes clear that the specified term is being employed in its traditional meaning, the terms "cure", "polymerize" and "cross-link" shall be used interchangeably in this specification and in the appended claims. Similarly, unless otherwise stated or as is obvious from the context in which it is employed, as used herein and the appended claims, the terms "curative", "curatives", "cure agent" and "cure agents" shall refer generally to those classes of materials, additives, co-constituents, etc. which are critical to initiate, effectuate and/or perpetuate, directly or indirectly, the cure, polymerization or cross-linking of the liquid curable monomers, oligomers, prepolymers and/or low molecular weight polymers of the curable composition.

One class of curing agents suitable for use in the compositions employed in the practice of the present invention includes those involved with the cross-linking of polymer and pre-polymer materials including cross-linkers, curatives and hardeners as well as agents used in conjunction therewith for initiating, accelerating, catalyzing, etc. the cross-linking or hardening of the polymer and pre-polymer materials. Another class of curing agents include those involved with the polymerization of one or more polymerizable monomers, oligomers, prepolymers and/or low molecular weight polymers including, for example, activators, co-activators, accelerators, co-accelerators, catalysts, co-catalysts, initiators and co-initiators; especially those involved with free-radical polymerization. In each instance, it is understood that such curing agents may or may not directly initiate or effectuate cure or polymerization; however, no or essentially no cure will occur in the absence thereof (at least from a commercially viable standpoint). For example, a curing agent may undergo a chemical reaction that affects another curing agent which then directly initiates or effectuates cure or polymerization. Specific examples of the various curatives are disclosed in more detail below in relation to the discussion on the various adhesive and sealant systems with which they are employed.

As stated above, the curable compositions employed in the practice of the present invention vary widely. Among the various classes of curable compositions suitable for use within the practice of the present invention are, for example, those that undergo vinyl polymerization, i.e., those having at least one vinyl group $CH_2=CHX-$ and/or reactive unsaturation (i.e., $-C=C-$); unsaturated polyesters; urethanes; epoxy resins; polysulfides; isocyanates; silicones; polyethers, polyurethanes and polyolefins having silanol moieties capable of undergoing silanol condensation or hydrosilation reactions; and phenoxy resins. The present invention is also applicable to combinations of curable compositions within the same or different classes, regardless of whether they cure by the same or a different mechanism. With the latter, the curative for each curable composition may be in the same or a different encapsulated carrier component. Alternatively, especially where the cure mechanism for one of the curable compositions is a longer term, secondary type cure mechanism, the curative for that curable composition may be encapsulated with the curable component for the other curable composition. Additionally, the curable compositions of the present invention may be capable of bi-modal cure or polymerization, i.e., they are able to cure or polymerize through two different cure mechanisms. For example, it may be especially desirable to have a curable composition that forms linear polymer chains by one mechanism and cross-links by another. Furthermore, such compositions may include a copolymerizable component and/or a secondary polymerizable component that co-polymerizes or co-reacts with the primary component or with secondary reactive sites on the primary polymer, respectively.

The curable compositions are based on low molecular weight, reactive monomers, oligomers, pre-polymers and/or polymers that can be cured or polymerized. Pre-polymer formulations typically include additional co-polymerizable monomers and/or oligomers and are essentially a pre-adhesive and/or pre-sealant. While the present invention is certainly, and in certain applications preferably, applicable to step growth polymerizable compositions, the requirement for proper stoichiometry of the primary polymerizable component and the hardener or co-reactive component makes these curable compositions more difficult to use. Furthermore, depending upon the molecular size of the hardener or co-reactive component, such compositions may require a much larger weight percent of the carrier particles than addition polymerizable compositions where the curatives tend to be low or lower molecular weight materials. Thus, the present invention is especially applicable to addition polymerizable compositions.

Preferred addition polymerizable curable compositions are those that undergo vinyl addition, including those based on styrene and substituted styrenes such as alpha-methyl styrene; acrylamides; nitriles such as cyanoacrylates and methacrylonitriles; vinyl ketones such as ethyl vinyl ketone; vinyl esters such as vinyl acetate and vinyl proprionate; olefins such as ethylene, propylene and isobutylene; halogenated olefins such as vinyl chloride and vinylidene chloride; and diene monomers such as butadiene, isoprene and chloroprene as well as copolymers of the foregoing such as vinyl chloride-vinyl acetate copolymer. Oftentimes it is desirable that such components be used in their oligomeric form, wherein the oligomer has residual unsaturation or another reactive moiety or functional group, for example, hydroxyl, amino, carboxylic, epoxy and the like groups, which enables further polymerization or cross-linking. For instance, an amine functionalized polystyrene oligomer may be employed whereby initial cure or polymerization occurs at the point of unsaturation concurrent with or followed by cross-linking at the amine functionality with, for example, an isocyanate.

Especially preferred additional polymerizable components are the poly- and mono-functional acrylate and methacrylate esters, i.e., monomers, oligomers and prepolymers having one or more acryloyl (i.e., $CH_2=C(R)COO-$) and/or methacryloyl (i.e., $CH_2=C(CH_3)COO-$) terminal or pendent moieties. For convenience, as used herein and in the appended claims, reference to the term "(meth)acrylate" is to be understood as referring to both the acrylate and the methacrylate versions of the specified monomer, oligomer and/or prepolymer, (for example "allyl(meth)acrylate" indicates that both allyl methacrylate and allyl acrylate are possible). Such materials encompass a broad spectrum of polymerizable components including, for example, polyester poly(meth)acrylates, urethane and polyurethane poly(meth)acrylates (especially those prepared by the reaction of an hydroxyalkyl(meth)acrylate with a polyisocyanate or a urethane polyisocyanate), methylcyanoacrylate, ethylcyanoacrylate, diethyleneglycol di(meth)acrylate, trimethylolpropane tri(meth)acrylate, ethylene glycol di(meth)acrylate, allyl(meth)acrylate, glycidyl (meth)acrylate, (meth)acrylate functional silicones, di-, tri- and tetraethylene glycol di(meth)acrylate, dipropylene glycol di(meth)acrylate, polyethylene glycol di(meth)acrylate, di(pentamethylene glycol) di(meth)acrylate, ethylene di(meth)acrylate, neopentyl glycol di(meth)acrylate, trimethylol propane tri(meth)acrylate, ethoxylated bisphenol A di(meth)acrylates, bisphenol A di(meth)acrylates, diglycerol di(meth)acrylate, tetraethylene glycol dichloroacrylate, 1,3-butanediol di(meth)acrylate, neopentyl di(meth)acrylate, trimethylolpropane tri(meth)acrylate, polyethylene glycol di(meth)acrylate and dipropylene glycol di(meth)acrylate. While di- and polyacrylates and methacrylates, especially the dimethacrylates, are the generally preferred materials. Monofunctional acrylates, i.e., those containing only one acrylate group, may also be advantageously used. Typical monoacrylates include 2-ethylhexyl(meth)acrylate, 2-hydroxyethyl (meth)acrylate, cyanoethyl(meth)acrylate, 2-hydroxypropyl (meth)acrylate, p-dimethylaminoethyl (meth)acrylate, lauryl (meth)acrylate, cyclohexyl (meth)acrylate, tetrahydrofurfuryl(meth)acrylate, chlorobenzyl(meth)acrylate, and glycidyl (meth)acrylate. Of course mixtures of (meth)acrylates or their derivatives as well as combinations of one or more (meth)acrylate monomers, oligomers and/or prepolymers or their derivatives with other copolymerizable monomers, including acrylonitriles and methacrylonitriles may be used as well.

(Meth)acrylates are typically polymerized by a free radical reaction. Initiators of free radical polymerization useful in the practice of the present invention include, but are not limited to peroxides, hydroperoxides, peresters, peracids, peroxycarbonates, peroxyketones, azo compounds and redox initiators, and derivatives of the foregoing. Exemplary initiators include benzoyl peroxide, cumene hydroperoxide, t-butyl hydroperoxide, dicumyl peroxide, decanoyl peroxide, lauroyl peroxide, di-(n-propyl)peroxide, t-butyl peroxide acetate, t-butyl perbenzoate, t-butylperoxybenzoate, t-butylperoxyacetate, di-t-butyl azodiisobutyronitrile, t-amyl peroxyneodecanoate, dichlorobenzoyl peroxide, methylethylketone hydroperoxide, t-butyl peroxide, t-amyl peroxypivalate, t-amyl peroxy-2-ethyl-hexanoate, t-butyl peroxyisobutyrate, di-sec-butyl peroxydicarbonate, di-(2-ethylhexyl)peroxydicarbonate, 1,1-dimethyl-3-hydroxybutyl peroxyneodecanoate, α-cumyl peroxyneoheptanoate, t-amyl peroxyneodecanoate, t-amyl peroxypivalate, t-butyl peroxypivalate, t-amyl peroxy-2-ethylhexanoate, t-amyl peroxyacetate, t-amyl perbenzoate, di-t-butyl peroxide, 2,2'-azobis(2-methylbutyronitrile), 2,2'-azobis(isobutyronitrile), 2,2'-azobis(2,4-dimethylpentanenitrile), 2,2'-azobis(2,4-dimethylvaleronitrile), 2,2'-azobis(2-methylpropanenitrile), 1,1'-azobis(cyclohexanecarbonitrile), 1,1'-azobis (cyanocyclohexane) and the like. Especially preferred initiators are the peroxides, hydroperoxides, peresters and peracids, most preferably benzoyl peroxide. Typically such initiators are present at a level of from about 0.01% to about 10%, preferably from about 0.5% to about 3.0%, most preferably from about 0.1% to about 2%, by weight based on the weight of the component(s) curable by the free radical polymerization.

In addition to the initiator, such free radical polymerizable compositions further include an accelerator of free radical polymerization. Commonly known accelerators include amines and sulfimides. Tertiary amines, such as N,N-dimethylparatoluidine, triethylenetetramine, diethylenetriamine, N,N-dimethylaniline, N,N-diethylparatoluidine, and N,N-diethylaniline, and sulfimides such as 3-oxo-2,3-dihydrobenz-[d]isothiazole-1,1-dioxide (saccharin) are particularly useful. Useful accelerators also include the aldehyde-amine reaction products such as butyraldehyde-aniline and butyraldehyde-butylamine. The most preferred accelerators, however, are the organometallic compounds known as metallocenes, especially the ferrocenes, and the organometallic polymers containing at least one metallocene, preferably ferrocene, moiety. Exemplary organometallic accelerators include ferrocene, butyl ferrocene, titanocene and cupricene. Accelerators are typically used at levels of from about 0.01% to about 1.0% by weight based on the weight of the component(s) curable by free radical polymerization.

A preferred class of (meth)acrylate based curable compositions suitable for use in the practice of the present invention is those know as anaerobic adhesive and sealant compositions. These compositions typically comprise a free radically polymerizable monomer, oligomer and/or pre-polymer, a free radical initiator and a free radical accelerator, with or without a stabilizer or inhibitor such as polyhydric phenols, quinones, and the like. Especially preferred polymerizable monomers, oligomers and prepolymers include 2-hydroxyethyl (meth) acrylate, 2-hydroxypropyl(meth)acrylate, mono-, di-, tri- and tetra-ethylene glycol di(meth)acrylate, trimethylol propane tri(meth)acrylate, ethoxylated bisphenol A di(meth)acrylates, polyester (meth)acrylates and their derivatives, polyethylene glycol (meth)acrylates and their derivatives and polyurethane (meth)acrylates and their derivatives. Suitable quinones include hydroquinones, benzoquinones, naphthaquinones, phenanthraquinones, anthraquinones and substituted compounds of the foregoing. These inhibitors preferably are present in the adhesive composition in only very small amounts, usually from about 10 to 1000 parts per million (ppm), and more preferably from about 50 to 500 ppm. The anaerobic compositions may also include chelators such as beta-diketones, ethylenediamine tetraacetic acid and the sodium salt thereof. Anaerobic compositions are especially suited for applications where concern exists for premature curing or polymerization of the curable components prior to mating of the substrates to be bonded or cured.

The present invention is also applicable to a broad array of epoxy resins including, but certainly not limited to, those of the types disclosed in Deckert et. al. (U.S. Pat. No. 3,746,068); Hart et. al. (U.S. Pat. No. 4,536,524); Earls et. al. (U.S. Pat. No. 5,510,431); and Siebert et. al. (U.S. Pat. No. 5,157,077 and U.S. Pat. No. 5,140,068), all incorporated herein by reference. Generally speaking, suitable epoxy resins typically comprise a mixture of low molecular weight oligomers containing, on average, two or more epoxide groups per molecule: though they may also comprise oligomeric prepolymers of the foregoing. The most common epoxy resins are those based upon glycidyl compounds, especially the glycidyl ethers such as those based on bisphenol A or on resorcinol and, to a lesser extent, the diglycidyl esters, especially the diglycidyl esters of phthalic acid, hexahydrophthalic acid and tetrahydrophthalic acid. Other suitable epoxy resins include the novolak-epoxy resins, particularly those based on the phenol novolaks or cresol novolaks, the glycidyl ethers of glycerol, polypropylene glycol or pentaerythritol, as well as the glycidyl esters, glycidyl amines, epoxidized diene polymers and the cycloaliphatic epoxy resins.

The epoxy resins may be polymerized by treatment with a hardeners or curing agents that react with the epoxide group. Suitable curing agents include aliphatic primary and secondary amines such as diethylenetriamine, triethylenetetramine, and diethylaminopropylene; aromatic amines such as m-phenylenediamine, 4,4"-diaminodiphenylmethane and diaminodiphenylsuphone; anhydrides, especially acid anhydrides, such as phthalic, tetrahydrophthalic, hexahydrophthalic, maleic, pyromellitic, trimellitic, nadic methyl, dodecenylsuccinic and chlorendic anhydrides and fatty polyamides. Other suitable curing agents include dicyandiamide, melamine, and imidazole derivatives; modified amines such as ethylene oxide- and acrylonitrile-epoxy resin adducts and ketimines, Lewis acids such as boron trifluoride-monoethylamine complex and Lewis bases such as o-(diethylaminoethyl)phenol, tris-(dimethylaminomethyl)phenol and 2-ethyl-4-methyl imidiazole. For chemically curing or polymerizing the epoxy compounds and resins, a number of cationic initiators may be used including HCl, HBr, HI, $C_6H_5SO_3H$, $HSbF_6$, $HAsF_6$, $HBF_4$ or Lewis acids such as metal halide salts. The amount of curing agent added depends upon the specific curing agent employed, but is typically 0.85 to 1.0 moles per epoxy stoichiometry, especially in the case of anhydrides or in stoichiometric amounts in the case of amines, or from about 0.01% to about 10%, preferably from about 0.1% to about 3% by weight, based on the weight of the curable epoxy, in the case of cationic initiators for chemical curing. With the anhydrides, about 1% of a tertiary amine is also employed as a catalyst. Those skilled in the art will readily appreciate the proper selection and quantity of hardeners and catalysts to employ.

Oftentimes, and preferably depending upon the application, an epoxy prepolymer is reacted with a polyol and most preferably a polyester or polyether polyol. Polyether polyols include linear and/or branched polyethers having a plurality of ether bonds and at least two hydroxyl groups. Examples of the polyether polyol include polyoxyalkylene polyol such as polyethylene ether glycol, polypropylene ether glycol, polybutylene ether glycol and the like. Suitable polyols include homopolymers and copolymers thereof, especially copolymers of the polyoxyalkylene polyols. Particularly preferable copolymers of the polyoxyalkylene polyols may include an adduct with at least one compound selected from the group consisting of ethylene glycol, propylene glycol, diethylene glycol, dipropylene glycol, triethylene glycol, 2-ethylhexanediol-1,3glycerin, 1,2,6-hexane triol, trimethylol propane, trimethylol ethane, tris(hydroxyphenyl)propane, triethanolamine, triisopropanolamine, ethylenediamine, and ethanolamine, with at least one compound selected from the group consisting of ethylene oxide, propylene oxide and butylene oxide.

Polyester polyols are formed from the condensation of one or more polyhydric alcohols having from 2 to 15 carbon atoms with one or more polycarboxylic acids having from 2 to 14 carbon atoms. Examples of suitable polyhydric alcohols include ethylene glycol, propylene glycol such as 1,2-propylene glycol and 1,3-propylene glycol, glycerol, pentaerythritol, trimethylolpropane, 1,4,6-octanetriol, butanediol, pentanediol, hexanediol, dodecanediol, octanediol, glycerol monoallyl ether, glycerol monoethyl ether, diethylene glycol, 1,3-bis-(2-hydroxyethoxy)-propane and the like. Examples of polycarboxylic acids include phthalic acid, isophthalic acid, terephthalic acid, maleic acid, octadecenylmaleic acid, fumaric acid, trimellitic acid, adipic acid, malonic acid, glutaric acid, and the corresponding acid anhydrides, acid chlorides and acid esters such as phthalic anhydride, phthaloyl chloride, and the dimethyl ester of phthalic acid. Preferred polycarboxylic acids are the aliphatic and cycloaliphatic dicarboxylic acids containing no more than 14 carbon atoms and the aromatic dicarboxylic acids containing no more than 14 atoms.

The curable compositions may also be based on unsaturated polyesters, many of which are derived from the same monomers as the aforementioned polyester polyols. Such unsaturated polyesters oftentimes exist as combinations thereof with an unsaturated monomer as a diluent, such as styrene. The unsaturated polyester resins are usually the product of a reaction between one or more unsaturated dibasic acids and one or more dihydric alcohols, including those noted in the prior paragraph. Curing or polymerizing the unsaturated polyesters typically requires an initiator and an accelerator; however, once free-radical polymerization is initiated, such polymerization is self-sustaining. Suitable accelerators include materials such as diethylaniline, dimethylaniline and N,N-dimethyl toluidine. Suitable initiators include such materials as benzoyl peroxide, ethylmethyl ketone peroxide, cumene hydroperoxide and dichlorobenzoyl peroxide. Of course other accelerators and initiators for the unsaturated polyesters may be used as well and are well known to those skilled in the art.

Another class of curable polymeric resins to which the present invention is applicable is the polyurethane prepolymer resins. Such polyurethane prepolymer resins include free isocyanate moieties or groups as the reactive or polymerizing moiety of the molecule and are typically the reaction product of poly(alkylene)glycols and polyisocyanates. Specific polyurethane prepolymers include, for example, the reaction product of poly(1,4-butylene oxide)glycol and tolylene diisocyanate and/or methylene diisocyanate. Such resins may have as much as 5 percent, by weight, of free isocyanate groups available for reaction. Curing agents suitable for use with the polyurethane prepolymer resins include methylene-bis-(o-chloroaniline), polyols (such as 1,4-butanediol), or trimethylolpropane, or even water. Other suitable polyurethane resins include those that have free hydroxyl or olefinic functionality and cure through free radical polymerization. Suitable catalysts for the polyurethanes include, among others, tin carboxylates, organosilicone titinates, alkyl titinates, bis carboxylates, tertiary amines, amidines, tin mercaptides, and naphthenates or alkanoate salts of lead, cobalt, manganese, bismuth or iron. Specific catalysts include tin(II) diacetate, tin(II) dioctanoate, tin(II) dilaurate, dibutyltin diacetate, dibutyltin dilaurate, dibutyltin maleate, stannous octoate, stannous oleate, stannous acetate, stannous laureate, 2,3-dimethyl-3,4,5,6-tetrahydropyrimidine, triethylamine, tributylamine, dimethylbenzylamine, N,N,N',N'tetramethethylenediamine, 1,2-dimethylimidazole, triethylenediamine, tetrabutyl titanate, tetrapropyl titanate, etc.

The curable compositions may also be based upon liquid polysulfide prepolymers comprising an oligomeric polysulfide terminated with thiol groups. Such polysulfides typically have the chemical structure: $HS(R-S_x)_nH$ where x is either 1 or a small number of 2-4; x is an integer of 1 to 25 and R is an alkylene, arylene or alkoxyalkylene, including, in particular, $-CH_2CH_2-$ and/or $-CH_2(OCH_2CH_2)_2-$ often times further included the branching group $-CH_2CHCH_2-$. Preferred oligomeric polysulfides are those based on the polyalkylene sulfides such as polyethylene sulphide and polypropylene sulfide as the polyarylene sulfides such as poly(2,4-tolylene sulfide), poly(4,4'-biphenylene sulfide), and poly(phenylene sulfide) (PPS). The thiol terminated oligomeric polysulfide may be polymerized or cured by reacting with epoxy or phenolic resins or compounds as well as with diisocyanates. Preferred polysulfide adhesives can be formed by reaction of a thiol terminated polysulfide with a di- or polyfunctional epoxide such as the diglycidyl ether of bisphenol-A. Alternatively, polymerization may be effected by reaction of the terminal thiol groups with an olefin, including various (meth)acrylates such as polyethylene glycol dimethacrylate. Curing agents for curable polysulfides also include manganese dioxide, lead dioxide, antimony trioxide, and tellurium dioxide.

Further, the present invention is also applicable to adhesive and sealant compositions based upon silicone materials. These silicon-containing materials typically have a hydroxyl group or a hydrolytically unstable group bound to a silicon atom. Cross-linking of these materials typically occurs through the formation of siloxane bonds. Suitable curing agents include tin octoate, lead octoate, and dibutyltin dilaurate. These curable compositions are particularly useful as sealing compositions where weathering resistance and heat resistance is important.

As noted above, the curable compositions may comprise mixtures of monomers, oligomers and/or prepolymers of the same general chemical class or of different classes so long as the systems are compatible and the resultant cured or polymerized adhesive or sealant has efficacious properties. Where combinations or mixtures of monomers, oligomers and/or prepolymers are used, there are three mechanisms by which the secondary component is incorporated with or into the composition of the primary curable component. First, the second polymerizable component may have a plurality of reactive or functional sites for co-reacting or co-polymerizing with the first component. Second, the second component may have polar groups such as oxygen, amine, ether, ester, hydroxyl, ketone, epoxy or carboxyl, which form hydrogen bonds with the cured or polymerized primary component. Third, the second component may be such as to stericly entangle or hinder the movement of opposing chains of the primary component.

Suitable secondary components which co-react or co-polymerize with the primary curable component include, for example, allyl(meth)acrylates, alkene glycol di(meth)acrylates, alkyldiol di(meth)acrylates, alkoxy alkanol di(meth)acrylates, and trialkanol tri(meth)acrylates, especially allyl (meth)acrylate, triethylene glycol di(meth)acrylate, ethylene glycol di(meth)acrylate, tetraethylene glycol di(meth)acrylate, polyethylene glycol di(meth)acrylate, 1,4-butanediol di(meth)acrylate, diethylene glycol di(meth)acrylate, 1,6-hexanediol di(meth)acrylate, neopentyl glycol di(meth)acrylate, polyethylene glycol di(meth)acrylate, 1,3-butylene glycol di(meth)acrylate, tripropylene glycol di(meth)acrylate, ethoxylated bisphenol di(meth)acrylate, dipropylene glycol di(meth)acrylate, alkoxylated hexanediol di(meth)acrylate, alkoxylated cyclohexane dimethanol di(meth)acrylate, pentaerythritol tri(meth)acrylate, and the like, and mixtures thereof. Of course other suitable materials include those previously mentioned with respect to each class of polymerizable component. Exemplary secondary components having polar groups for forming hydrogen bonds include, for example, alkoxy acrylate, alkoxy methacrylate, polyester acrylate, polyester methacrylate, acrylalkoxy phthalic acid, methacrylalkoxy phthalic acid, glycidyl methacrylate, glycidyl acrylate, cycloalkoxy acrylate, cycloalkoxy methacrylate, and the like. Finally, suitable secondary components that result in steric entanglement or that stericly hinder the movement of opposing chains of the forming adhesive polymer include, for example, alkyl(meth)acrylates of greater than 14 carbons, cycloalkyl (meth)acrylates, multicyclic alkyl(meth) acrylates, aralkyl(meth)acrylates, cycloalkoxy(meth)acrylates and the like. Specific examples include stearyl acrylate, stearyl methacrylate, isobornyl methacrylate, benzyl acrylate, cyclohexyl methacrylate, and cetyl acrylate.

The foregoing sets forth but a brief overview of the myriad of curable compositions to which the present invention is applicable and is not intended to be limiting to the aforementioned classes of curable compositions nor to the specific polymerizable components mentioned therein. The curable compositions may further contain a number of other optional constituents such as terpene resins, including, for example, terpenes, wood rosin resins, esters of gum rosin, styrenated terpene, and terpene phenolic resins, as tackifiers and/or liposoluble additives, such as limonene, dipentene, terpene resins, or oil of turpentine, for improving the adhesive strength of the curable composition on oily metal sheets. Such additives are typically included in an amount of 1-10 percent by weight, relative to the weight of the curable composition. Of course such curable compositions may optionally contain any number of other known additives therefore including dyes, pigments, plasticizers, stabilizers, inhibitors, thickeners, solvents, surfactants, emulsifying agents and the like, as is well known to those skilled in the art.

Additional curable compositions, which can be modified or adapted for use in accordance with the teaching of the present invention to provide the benefits and attributes of the present invention, are well know and readily recognized by those skilled in the art. Exemplary curable compositions are further disclosed in, for example, Mahdi et. Al. (US 20020010272), Bachmann et. al. (U.S. Pat. No. 3,814,156), Chernack (U.S. Pat. Nos. 4,940,852 and 4,808,639), Wallace (U.S. Pat. Nos. 4,428,982 and 4,081,012), Krieble (U.S. Pat. Nos. 3,489,599 and 3,746,068), Newell (U.S. Pat. No. 4,252,708); Kropp et. al. (U.S. Pat. No. 6,573,328), Matsuo (U.S.

Pat. No. 6,025,074); Fryd et. al. (U.S. Pat. No. 4,980,410); Azevedo (U.S. Pat. No. 4,417,028), Cooke et. al. (U.S. Pat. No. 4,497,916), Chao (U.S. Pat. No. 6,375,872); Usami et. al. (U.S. Pat. No. 5,397,812), Wolinski et. al. (U.S. Pat. No. 4,126,504), Siebert et. al. (U.S. Pat. Nos. 5,140,068 and 5,157,077), Deckert et. al. (U.S. Pat. No. 3,746,068), Hart et. al. (U.S. Pat. No. 4,536,524), Earls et. al. (U.S. Pat. No. 5,510,431), Hilbelink et. al. (U.S. Pat. No. 3,725,501), Sweeney (U.S. Pat. Nos. 4,830,558 and 4,555,206) and Rich et. al. (U.S. Pat. Nos. 5,635,546 and 5,853,520), among others, all of which are hereby incorporated herein by reference.

Though many of the foregoing curable compositions may have been used or adapted for use in a pre-applied form, the primary critical and distinguishing aspect of the pre-applied curable compositions of the present invention is the fact that at least one curative therefore is present as an encapsulated curative complex wherein said curative complex (i) comprises at least one curative for effecting, directly or indirectly, the cure or polymerization of the liquid curable or polymerizable component and (ii) is substantially non-flowing in the absence of external forces or conditions impacting upon said curative complex. The carrier may be any of a number of different materials depending upon the process and materials to be used for encapsulating the curative complex, the chemistry of the curable compositions and the end-use applications in which they are to be used, and the process or method by which the curative is to be made available to the curable, polymerizable or cross-linkable component of said curable composition. Generally speaking the carrier will be selected from natural and synthetic materials or compositions that are (a) soft, putty-like or gel-like in character or (b) solid or semi-solid so long as the solid or semi-solid carrier material is (i) soluble in or is softened by the liquid curable matrix component of the curable composition with which they are to be used, (ii) is softened by the reaction and/or environmental conditions under which the curable composition is cured or polymerized and/or (iii) is softened by the method or process by which the curative is to be made available to the curable, polymerizable or cross-linkable component of said adhesive or sealant.

The carrier may be comprised of substantially polymeric or oligomeric components and/or monomeric components provided that the carrier composition itself exhibits the aforementioned characteristics. Furthermore, it is understood that a given curative complex may include two or more curatives or there may be two or more different curative complexes, each with the same or a different curative or the same of a different carrier. It is also contemplated that the carrier may be or may generate in-situ a thixotropic material or latent thixotropic material; however, because of the small particle size of the microcapsules, thixotropy must be inherent or made inherent to the composition or material comprising the carrier. Traditional inorganic thixotropic additives which are added to liquid systems, such as fumed silica, are, at this time, generally considered inappropriate for use in the preparing the microencapsulated cure systems due to the relatively large particle size of current day inorganic thixotropic additives as compared to the particle size of the microencapsulated cure systems. Alternatively, or in addition, the carrier composition may include or comprise one or more non-thixotropic gelling or thickening agents that act latently such that the carrier or carrier precursor material immediately prior to or during the encapsulation process is of a low viscosity and following encapsulation is of an increased viscosity, generated in-situ.

As used in this application and the appended claims, the terms "soft" and "putty-like" mean that the referenced materials do not flow or deform without moderate force, generally without a force of at least 1 psi, preferably at least 5 psi. These soft or putty-like materials may have no or little to moderate elasticity, preferably a consistency and degree of elasticity of from that of cake frosting to that of bread dough, so that as sufficient and repetitive forces are acted upon the encapsulated carrier, more of the curative within the carrier material is exposed and/or made available. Similarly, reference to softening of the carrier material means that the carrier material becomes soft or putty-like or even flowable upon exposure to certain materials and/or conditions including, for example, upon exposure to liquid components of the curable composition in which the carrier is wholly or partly soluble, miscible or swellable or to heat or by mastication in the case of a rubbery carrier material.

Exemplary of the materials that may be suitable for use as a carrier include any of a number of low Tg materials including hot melts, pressure sensitive adhesives, rubber materials and other low Tg polymers, semi-solid and solid resins, starches and starch-based polymers, hydrogels, and low temperature waxes provided that the foregoing meet one or more of the aforementioned characteristics and do not interfere with the cure or polymerization or cross-linking of the curable compositions or materially degrade the desired adhesive or sealant properties of the so cured, polymerized or crosslinked compositions. Though the absence of heat for activation and/or cure is an especially desirable benefit of the present invention, in an alternate embodiment, it is envisioned that the carrier could be a low melting temperature wax, e.g. a wax having a melting point less than 150° F., preferably less than 130° F., most preferably less than 120° F. For example, therapeutic paraffin waxes could be used as the carrier.

As noted above, the carrier may also comprise or include organic and inorganic thixotropic, thickening and gelling agents, particularly those used commercially to control the flow and rheology characteristics of, for example, paints, adhesives, sealants, engine and industrial oils, and food products. Suitable organic polymeric thickening or gelling agents include styrene/olefinic block copolymers sold under the Kraton brand, and a variety of small molecules that can associate chemically or physically, such as various plasticizers, thickeners, flow control agents, and the like. As noted previously, current conventional inorganic thixotropic, thickening and gelling agents are typically not suitable for use in the preparation of the microencapsulated cure system unless the particle size of such inorganic additive is extremely small and the particle size of bead of the carrier material or carrier precursor material to be encapsulated is very large. However, should technology evolve whereby nano-sized inorganic thixotropic, thickening and gelling agents are capable of being produced, it is certainly contemplated that those materials will have applicability in the practice of the present invention.

It is also contemplated that the carrier or the components thereof may be co-reactive with the curable composition and/or the curative. For example, with respect to the former, the carrier may have a functional group that serves as a reactive or cross-link site with which the polymerizable monomers, prepolymers and/or polymers of the curable composition react during polymerization or cure.

Alternatively, and preferably, the carrier composition may comprise (a) a mixture of one or more liquid mono- and/or poly-functional monomers, oligomers and/or prepolymers that copolymerize with the liquid curable components of the curable compositions and (b) a viscosity modifier which is (i) a slow acting, latent gelling or thickening agent, (ii) a temperature activated gelling or thickening agent (no gel at elevated temperatures) and/or (iii) a shear sensitive gelling or thickening agent. In this embodiment, the carrier composition is subjected to conditions whereby the composition is of low viscosity, i.e., where the viscosity modifier has no or substantially no effect, at that point during the encapsulation process wherein the fine beads or droplets of the mixture (a) containing the viscosity modifier (b) are prepared for encapsulation and returns to or becomes of a much higher viscosity, exhibiting the characteristics of the carrier as defined earlier, subsequent thereto. For example, the elevated temperature or shear forces that lower the viscosity may be removed following formation of the droplets and prior to, concurrent with, or subsequent to the application or deposit of the shell wall or shell wall forming material. Alternatively, following formation of the droplets, the emulsion, dispersion, suspension, colloid, etc. of the mixture (a) and viscosity modifier (b), the droplets may then be subject to such conditions as effectuate or accelerate the gelling or thickening properties of the latent gelling or thickening agent. Employing carriers comprised of the mixture (a) has the added benefit of maximizing the amount of liquid curable components in the final curable composition and minimizing the amount of other inert ingredients and/or ingredients which may affect or modify the properties of the cured or polymerized curable composition.

It should be noted that where the carrier is a thickened or gelled or thixotropic material, the viscosity at the time of formation of the beads is low such that low or moderate shear forces create fine droplets, consistent with the desired particle size and particle size distribution of the to be formed encapsulated curative complex. In their thickened, gelled or thixotropic state, the viscosity is such that even moderate to high shear forces will not allow for the preparation of fine, preferably substantially uniform, droplets or for droplets having a narrow, traditional bell curve particle size distribution.

As noted above, the curative may also take part in the polymerization of certain or all components of the carrier composition provided that the amount of curative incorporated into the carrier precursor composition is sufficient so that adequate amounts remain following completion of the polymerization of the carrier so as to be able to effectuate cure of the curable composition. Preferably, though, the curing agent for the curable composition is not, or is not to any meaningful extent, involved with the cure or polymerization of the carrier. Instead, the carrier precursor composition includes one or more other curing agents for affecting its cure, leaving the encapsulated curing agent available for effecting cure or polymerization of the curable composition. In any event, it is important that the curative to be incorporated into the carrier not react with the carrier once formed so as to ensure long-term shelf stability and efficacy of the curative in the encapsulated carrier. Of course, the curative may, and most likely is, involved with the chemical reaction between the carrier and the curable components of the curable composition, if any. The key is that the curative not be reactive with the carrier in its encapsulated form.

Furthermore, the carrier complex may have incorporated therein other components of the adhesive or sealant or other additives pertinent to the carrier itself including, for example, plasticizers to enhance the pliability or softness of the carrier and/or tackifier resins. Again, however, it is important that such other components not interfere with the cure or polymerization or cross-linking of the curable compositions or materially degrade the desired adhesive or sealant properties of the so cured, polymerized or cross-linked compositions. Suitable plasticizers include phthalates, adipates, hydrocarbon resins, oils, and fatty acid esters, including for example methyl palmitate and methyl stearate. Especially preferred plasticizers are those based on polybutenes and combinations thereof, alone or together with other additives such as aliphatic lactate esters as taught in Wyffels (U.S. Pat. No. 5,688,850), incorporated herein by reference. Suitable tackifier resins include aliphatic and/or aromatic hydrocarbon resins and terpene resins.

While the carrier may be an inert material from the perspective of bonding or sealing, it is preferred that the carrier itself participate in the bonding or sealing performance of the overall adhesive or sealant system in which it is incorporated. Specifically, it is oftentimes desirable for the carrier to possess inherent or latent adhesive or sealant properties. For example, the carrier may be or contain a hot melt adhesive, a pressure sensitive adhesive, an elastomer/tackifier composition, a thickened or gelled mass of one or more monomers, oligomers or mixtures thereof, etc. By employing a carrier which has adhesive characteristics, the carrier is able to provide an initial and immediate bond between two substrates to be bonded, holding the two in proper alignment while providing sufficient time for the curable composition to cure, polymerize or cross-link, as appropriate. This is particularly beneficial in high speed, industrial bonding applications where only a very brief time, on the order of fractions of a second, are possible to apply pressure between the two substrates to be bonded, especially in those instances where the substrates to be bonded have forces, whether inherent in the product design and/or materials of which they are made or unrelated to the substrates, that, in the absence of an immediate tack bond, would cause the two substrates to come apart, thus, making a bond impossible. For example, in bonding opposing end flaps of a cereal box whose natural tendency is to open, the use of a carrier with adhesive characteristics will hold the flaps together while the curable or polymerizable material cures or polymerizes to form the formal bond.

As mentioned above, it is also contemplated that the curing system of the present invention may comprise a mixture of two or more different microencapsulated carriers each containing the same or a different curing agent and/or carrier material. For example, one may tailor the adhesive characteristics contributed by the carrier by employing a combination of carrier particles, some of which contain a higher percentage of material with latent adhesive properties and others with a carrier material of low or no adhesive properties. Alternatively, a portion of the carrier particles may comprise a gel containing a mixture of mono- and/or or poly-functional monomers that are co-polymerizable with the curable composition and the remainder comprise an adhesive. Such compositions provide limited, quick bonding capability with more liquid curable components so as to enhance the adhesive composition while lessening the amount of non-participating, non-reactive carrier. In essence, the use of mixtures of different carrier particles enables one to balance the immediate and latent adhesive properties of the ultimate adhesive composition.

As noted, the carrier material may be a hydrogel. Suitable hydrogels include, but are not limited to, those derived from gelatin, polysaccharides, alginates, cross-linked polyacrylamide polymers, hydroxyethylmethacrylate polymers, cross-linked polyhydroxyethylacrylate, polymerized, cross-linked 2-acrylamido-2-methylpropane sulfonic acid polymers and their salts, including particularly the sodium and potassium salts, cross-linked polyvinylpyrrolidone, polyacrylic acid, copolymers of the foregoing with each other and/or other polymers such as polystyrene or other non-hydrogel forming polymers. An exemplary hydrogel is that based on poly-2-hydroxyethylmethacrylate, preferably cross-linked with ethylene glycol dimethacrylate.

The carrier may also be an elastomer composition. Exemplary elastomers are those exhibiting a second order glass transition temperature (Tg), or a softening point, of less than 25° C., preferably less than –0° C., especially those soluble in (meth)acrylate ester monomers. Such elastomers are synthetic high polymers with exhibit plastic flow, particularly, polychloroprene and copolymers of butadiene or isoprene with styrene, acrylonitrile, (meth)acrylate esters, and the like. Additional useful elastomers include copolymers of ethylene and (meth)acrylate esters, homopolymers of epichlorohydrin and copolymers of epichlorohydrin and ethylene oxide. Specific examples include CR-neoprene-polychloroprene, NBR-nitrile rubber-butadiene-acrylonitrile copolymer, styrene-butadiene copolymer, acrylic rubber acrylate butadiene copolymer, and copolymers of ethylene and acrylate esters such as methylacrylate and ethylacrylate. Of course, higher Tg materials may be used, especially where the curable composition is to be activated at higher temperatures or otherwise experiences higher temperatures during activation, e.g., where friction of mixing or the activator means creates higher temperatures. Also included in this class of materials are the so-called rubber resin adhesives that comprise an elastomeric ingredient such as crude natural rubber, styrene-butadiene elastomer, a polybutadiene, polyisobutylene and polysiloxane and a tackifying resin such as glyceryl esters of hydrogenated rosin, thermoplastic terpene resins, petroleum hydrocarbon resins, coumarone-indene resins, synthetic phenol resins, low-molecular weight polybutenes and tackifying silicone resins.

The carrier may also be an adhesive or pressure sensitive adhesive material having a low Tg or low softening point, preferably less than 25° C. and having an elastic modulus of less than about $5 \times 10^5$ dynes/cm$^2$ at 70° C., as measured using a dynamic mechanical thermal analyzer Model RSA II (available from Rheometrics Co.). Suitable adhesives include the acrylate-based pressure sensitive adhesives, particularly those that generally do not require the addition of a tackifier resin. Such acrylates typically have alkyl chains of from 1 to 14 carbon atoms per molecule, preferably from 4 to 12 carbon atoms per molecule. A mixture of different acrylate monomers may be used, but at least a major portion of the alcohol residue forming the alkyl tails of the molecules generally have carbon-to-carbon chains of at least four carbon atoms terminating at the ester linkages. Examples of useful acrylate-based polymeric materials are the homo- and co-polymers of methyl isoamylacrylate, isooctyl acrylate, commercial fuse oil acrylate and 2-ethylhexylacrylate. The copolymers may include acrylic acid, methacrylic acid, acrylamide, methacrylamide, acrylonitrile and methacrylonitrile as co-monomers. Other acrylic materials include multi-component compositions comprising, for example, a low Tg acrylate monomer such as n-butyl acrylate, ethyl acrylate, 2-methylbutyl acrylate, isobutyl acrylate, isooctyl acrylate, 2-ethyl hexyl acrylate and the like, a functional monomer such as N,N-dimethyl (meth)acrylamide, N,N-diethyl(meth)acrylamide, N-vinylpyrrolidone and the like, and a higher Tg acrylate monomer such as 3,5-dimethyladamantyl(meth)acrylate, isobornyl(meth)acrylate, 4-bipheny (meth)acrylate, and 2-nephthyl(meth)acrylate. Still another class of pressure sensitive materials are the acrylic hot melt PSAs of Mancinelli (U.S. Pat. No. 5,225,470), incorporated herein by reference.

The present invention is particularly suited for those carrier materials that are polymerized in-situ concurrent with or subsequent to encapsulation of the carrier complex, including, e.g., pressure sensitive adhesive carrier materials. Exemplary systems include those disclosed in, for example Schwantes (U.S. Pat. No. 6,592,990) and Nagai et. al. Such systems generally comprise addition polymerizable pre-polymers, including, for example, alkyl(meth)acrylate, aralkyl (meth) acrylate, cycloalkyl(meth)acrylate, alkoxy(meth)acrylate, cycloalkoxy (meth)acrylate, bicycloalkyl(meth)acrylate, and alkoxy(alkoxy)$_n$ (meth)acrylate, wherein the alkyl moieties have from 1 to 16 carbon atoms, the cycloalkyl moieties have from 4 to 8 carbon atoms, and n is an integer from 1 to 6.

Especially suitable addition polymerizable pre-polymers for use in the formation of the carrier complex include those whose homopolymer has a Tg of less than about 0° C., a flash point of at least 75° C., and a boiling point of at least 175° C., including, for example, n-pentyl acrylate, 2-methyl butyl acrylate, 2-ethylhexyl acrylate, n-octyl acrylate, n-decyl acrylate, n-dodecyl acrylate, lauryl methacrylate, lauryl acrylate, 2-ethylhexyl methacrylate, n-octyl methacrylate, iso-octyl acrylate, iso-octyl methacrylate, isononyl acrylate, iso-decyl acrylate, 2-ethoxyethyl methacrylate, butyl diglycol methacrylate, tetrahydrofurfuryl acrylate, 2-phenoxyethyl acrylate, isohexyl acrylate, tridecyl acrylate, tridecyl methacrylate, ethoxylated nonyl phenol acrylate and the like and mixtures thereof.

Optionally, the in-situ formed carrier may contain a terpene resin in addition to the polymerizable prepolymer. Terpene resins function as tackifiers and, for purposes of the invention, include wood rosin resins, esters of gum rosin, styrenated terpene and terpene phenolic resins (including CAS #259094-71-8). Examples of terpene resins include modified terpene resins, such as those sold under the Sylvares™ and Zonatac™ tradenames (Arizona Chemical, Panama City, Fla.), as well as the ester-modified or polyol ester modified terpene resins such as Sylvalite™ (CAS#8050-26-8) and the like.

Optionally, the composition from which the in-situ formed carrier is derived may include a second substantially water insoluble polymerizable pre-polymer which pre-polymer is multifunctional having at least two addition polymerizable sites. By "substantially water insoluble" is meant that the material has a solubility in water of less than about 2% more preferably less than 1% by weight. The addition polymerizable sites of said prepolymers interact with other addition polymerizable sites in the transformation of the pre-polymers to an encapsulated tacky adhesive material. Exemplary second substantially water insoluble polymerizable pre-polymers include allyl methacrylate, alkene glycol dimethacrylate, alkyl dimethacrylate, alkyldiol dimethacrylate, alkoxy alkanol diacrylate, trialkanol triacrylate, alkoxy(alkoxy)$_n$ alkyl triacrylate, alkoxy(alkoxy)$_n$ alkyl dimethacrylate, aralkyl dimethacrylate, cycloalkyl dimethacrylate, alkoxy dimethacrylate, bicycloalkyl dimethacrylate, cycloalkoxy dimethacrylate, allyl acrylate, alkene glycol diacrylate, alkyl diacrylate, alkyldiol diacrylate, alkoxy alkanol dimethacrylate, trialkanol trimethacrylate, alkoxy(alkoxy)$_n$ alkyl trimethacrylate, alkoxy(alkoxy)$_n$ alkyl diacrylate, aralkyl diacrylate, cycloalkyl diacrylate, alkoxy diacrylate, bicycloalkyl diacrylate, cycloalkoxy diacrylate, wherein the alkyl moieties are of 1 to 16 carbons, the cycloalkyl moieties are of 4 to 8 carbons, n is an integer from 1 to 6. More specifically, the second substantially water insoluble polymerizable pre-polymer having at least two addition polymerizable sites can be selected from any of allyl methacrylate; triethylene glycol dimethacrylate; ethylene glycol dimethacrylate; tetraethylene glycol dimethacrylate; polyethylene glycol dimethacrylate; 1,3 butylene glycol diacrylate; 1,4-butanediol dimethacrylate; 1,4-butanediol diacrylate; diethylene glycol diacrylate; diethylene glycol dimethacrylate; 1,6 hexanediol diacrylate; 1,6 hexanediol dimethacrylate; neopentyl glycol diacrylate; neopentyl glycol dimethacrylate, polyethylene glycol diacrylate; tetraethylene glycol diacrylate; triethylene glycol diacrylate; 1,3 butylene glycol dimethacrylate; tripropylene glycol diacrylate; ethoxylated bisphenol diacrylate; ethoxylated bisphenol dimethacrylate; dipropylene glycol diacrylate; alkoxylated hexanediol diacrylate; alkoxylated cyclohexane dimethanol diacrylate; propoxylated neopentyl glycol diacrylate, trimethylolpropane trimethacrylate; trimethylolpropane triacrylate, pentaerythritol triacrylate, ethoxylated trimethylolpropane triacrylate, propoxylated trimethylolpropane triacrylate, propoxylated glyceryl triacrylate, di(trimethylolpropane) tetraacrylate, dipentaerythritol pentaacrylate, ethoxylated pentaerythritol tetraacrylate, and the like, and mixtures thereof.

The second substantially water insoluble polymerizable pre-polymer can have at least three different mechanisms for forming a tacky adhesive with the first pre-polymer. The second polymerizable pre-polymer can have two reactive sites or polyfunctional sites for reacting with the first pre-polymer. Alternatively, the second pre-polymer can be selected to have polar groups such as oxygen, amine, ether, ester, alcohol, ketone, hydroxy, epoxy, carboxylic acid, or aryl acid, without limitation, for purposes of hydrogen bonding with other polar groups of the adhesive forming polymer. Yet a third alternative is to select the second pre-polymer such that it stericly entangles or hinders the movement of opposing chains of the adhesive being formed.

Suitable second substantially water insoluble polymerizable prepolymers having polar groups can be selected from the group consisting of alkoxy(meth)acrylates, polyester (meth)acrylate, alkoxy(alkoxy)$_n$ alkyl (meth)acrylate, (meth)acrylalkoxy phthalic acid, glycidyl(meth)acrylate, cycloalkoxy(meth)acrylate, and acyloxy(meth)acrylate wherein said alkyl moieties are from one to sixteen carbons, wherein the cycloalkyl moieties are from four to eight carbons, wherein n is an integer from one to six. Specific examples of the second substantially water insoluble polymerizable pre-polymer includes materials selected from the group consisting of butyl diethyleneglycol methacrylate, 2-methoxyethyl acrylate; 2-ethoxyethyl methacrylate; butyl diglycol methacrylate; t-butylaminoethyl methacrylate; 2-(2-oxoimidazolidin-1-yl-ethyl) methacrylate; tetrahydrofurfuryl methacrylate; tetrahydrofurfuryl acrylate; 2-phenoxyethyl acrylate; 2-phenoxyethyl methacrylate; glycidyl methacrylate; ethoxylated nonyl phenol acrylate; ethoxylated hydroxyethyl methacrylate; alkoxylated tetrahydrofurfuryl acrylate; ethoxylated nonyl phenol methacrylate; alkoxylated nonyl phenol acrylate; caprolactone acrylate; 2-acryloxy ethoxy-o-phthalic acid; 2-acryloxy-1-methylethoxy-o-phthalic acid and 2-acryloxy-1-methylethoxy-o-dihydro-(3,6)-phthalic acid.

As stated above, another alternative for the second substantially water insoluble polymerizable pre-polymers are prepolymers that result in steric entanglement or that stericly hinder the movement of opposing chains of the adhesive forming polymer. Such prepolymers include, for example, alkyl (meth)acrylates of greater than 14 carbons, cycloalkyl (meth)acrylates, multicyclic alkyl(meth)acrylate, aralkyl (meth)acrylate, and cycloalkoxy (meth)acrylate, wherein the alkyl moieties are of at least 14 carbons, and wherein the cycloalkyl moieties are of at least 6 carbons. Exemplary of the substantially water insoluble polymerizable pre-polymer which stericly hinders the first water insoluble polymerizable pre-polymer are stearyl acrylate; stearyl methacrylate; acrylate C 18-22, dicyclopentenyloxyethyl methacrylate; dicyclopentyl oxyethyl methacrylate; isobornyl methacrylate; isobornyl acrylate; benzyl acrylate; benzyl methacrylate; cyclohexyl acrylate; cyclohexyl methacrylate; and cetyl acrylate. Some of the materials identified as participating in hydrogen bonding earlier, such as tetrahydrofurfuryl methacrylate and acrylate, and also for example, 2-phenoxy ethyl acrylate and methacrylate can also function as stericly hindering pre-polymers.

For effecting in-situ polymerization of the carrier, the carrier precursor composition typically includes a catalytically effective amount of a substantially water insoluble free radical initiator along with the addition polymerizable prepolymer(s) and, if present, solvent. The solvent provides a medium in which the various prepolymer materials can undergo polymerization. Suitable solvents include petroleum oils, vegetable oils, vegetable oil esters, liquid hydrocarbon resins, liquid plasticizers and blends thereof. The free radical initiator is selected to have a half-life of at most 10 hours at 25° C., and more preferably at most 1 hour at 25° C. The free radical initiator needs to be soluble in the polymerizable pre-polymer material and solvent. The free radical initiator can be selected from the group of initiators comprising an azo initiator, peroxide, dialkyl peroxide, alkyl peroxide, peroxyester, peroxycarbonate, peroxyketone and peroxydicarbonate. More particularly the free radical initiator is selected from 2,2'-azobis (isobutylnitrile), 2,2'-azobis(2,4-dimethylpentanenitrile), 2,2'-azobis(2,4-dimethylvaleronitrile), 2,2'-azobis(2-methylpropanenitrile), 2,2'-azobis (methylbutyronitrile), 1,1'-azobis(cyclohexanecarbonitrile), 1,1'-azobis (cyanocyclohexane), benzoyl peroxide, decanoyl peroxide; lauroyl peroxide; benzoyl peroxide, di(n-propyl) peroxydicarbonate, di(sec-butyl) peroxydicarbonate, di(2-ethylhexyl) peroxydicarbonate, 1,1-dimethyl-3-hydroxybutyl peroxyneodecanoate, α-cumyl peroxyneoheptanoate, t-amyl peroxyneodecanoate, t-butyl peroxyneodecanoate, t-amyl peroxypivalate, t-butyl peroxypivalate, 2,5-dimethyl 2,5-di(2-ethylhexanoyl peroxy)hexane, t-amyl peroxy-2-ethylhexanoate, t-butyl peroxy-2-ethylhexanoate, t-butyl peroxyacetate, di-t-amyl peroxyacetate, t-butyl peroxide, di-t-amyl peroxide, 2,5-dimethyl-2,5-di-(t-butylperoxy)hexyne-3, cumene hydroperoxide, 1,1-di(t-butylperoxy)-3,3,5-trimethyl-cyclohexane, 1,1-di-(t-butylperoxy)-cyclohexane, 1,1-di-(t-amylperoxy)-cyclohexane, ethyl-3,3-di-(t-butylperoxy)-butyrate, t-amyl perbenzoate, t-butyl perbenzoate and ethyl 3,3-di-(t-amylperoxy)-butyrate.

In yet another alternative embodiment of the present invention, the carrier material may be one that is heat sensitive, i.e., one that transforms from a solid or semi-solid state to a liquid or putty-like state upon exposure to relatively low elevated temperatures. In particular, such carriers have a melting point or range above ambient temperature (~25° C.) and are substantially insoluble in the encapsulating medium and, preferably, will have substantial, or at least partial, solubility in the curable composition at temperatures above the melting point, or in and above the melting range. Preferably the carrier has a melting point or range in the range 35° C.-150° C., more preferably in the range 40° C.-85° C. Suitable heat sensitive carrier materials include polyethylene glycols, preferably having molecular weights in the range 4000 to 20,000; acid waxes; stearic acid and stearates. A particularly suitable material is polyethylene glycol of average molecular weight 4000, which is a wax. Other suitable materials are described in Cooke et. al. (U.S. Pat. Nos. 4,497,916 and 3,547,851), incorporated herein by reference.

Finally, other suitable carriers include, for example, the core materials disclosed in Gosiewski et. al. (U.S. Pat. No. 5,206,288), Cahalan et. al. (U.S. Pat. No. 4,768,523), Sataki et. al. (U.S. Pat. No. 5,814,685), Everaerts et. al. (U.S. Pat. Nos. 5,905,099 and 5,612,136), Mudge (U.S. Pat. No. 4,908,268), Sanderson et. al. (U.S. Pat. No. 4,077,926), Mancinelli (U.S. Pat. Nos. 5,225,470 and 5,006,582), Iovine et. al. (U.S. Pat. No. 4,721,748), and Petras et. al. (U.S. Pat. No. 4,061,826), all of which are herein incorporated by reference.

The encapsulated curative employed in the practice of the present invention is prepared in a two-step process, the first being the incorporation of the curative in the carrier and the second the encapsulation of the modified carrier. As will be readily apparent to those skilled in the art, any number of a variety of methods may be used for accomplishing both of these steps. However, the selection of the specific processes will depend upon a number of factors including, in particular, the materials to be used, the point at which the curative is to be incorporated into the carrier, and the manner by which such carrier materials are converted into particle form. In one embodiment where the carrier is a solid or semi-solid material, the curative is compounded or kneaded into the carrier material and, if the resultant material is sufficiently rigid, ground to the desired particle size or if not rigid, frozen and then ground to the desired particle size. For example, the curative may be incorporated into a polymer melt of the carrier or, if the carrier were a wax, the curative would be blended into the liquefied wax and then the mix hardened. Yet again, the curative could be kneaded into a soft, pliable or malleable polymeric or elastomeric carrier using a roll mixer, Banbury mixer or the like. In essence any of the known methods for incorporating a solid or semi-solid into another solid or semi-solid may be employed provided that the processing conditions are such as not to adversely affect or degrade the curative.

Where the curative is a liquid or in solution, it is possible to use a solid or semi-solid carrier that absorbs or is swelled by the liquid curative or solvent of the curative solution. In this process, the carrier acts much like a sponge, whereby liquid curative is absorbed into the carrier or, if a solution, the solvent brings the curative into the carrier. In those cases involving a curative solution, the solvent is preferably allowed to evaporate prior to encapsulating, or if the carrier following such evaporation is not in the proper particulate form, grinding the carrier prior to encapsulation. However, it is not always necessary to drive off the solvent or all of the solvent where the solvent of the curative solution acts as a plasticizer for the carrier, thus, softening the carrier to facilitate access to or exposure of the curative upon activation, without interfering with or having a detrimental impact on the performance or desired properties of the cured adhesive or sealant.

Alternatively, where the carrier itself is in solution, the curative may be added thereto before driving off the solvent and recovering the modified carrier. Alternatively, depending upon the carrier and the nature of the carrier solution, certain additives, pH adjustments and/or temperature changes and the like can be employed to precipitate out the modified carrier, Another approach to the incorporation of the curative into the carrier is by dispersing or dissolving, whether wholly or partly soluble or miscible, the curative in one or more of the precursor materials or reactants that are used to form the carrier material. If the curative is also effective in initiating, accelerating or facilitating the cure or polymerization of the carrier, then sufficient excess of the curative must be used to ensure that adequate curing agent remains in the carrier following its formation. This reaction mix may then be cured or polymerized to form the modified carrier and the so formed mass ground to the desired particle size. Alternatively, the aforementioned reaction mix or the components thereof may be added to an appropriate liquid medium and subjected to shear mixing so as to form a colloidal solution, suspension or emulsion. The colloidal solution, suspension or emulsion may then be subject to the appropriate conditions for effecting cure or polymerization of the reaction mix to form the modified carrier particles prior to encapsulation or an appropriate encapsulating material may be added to the solution for effecting encapsulation of the reaction mix droplets and thereafter forming the capsule or shell wall, with or without concurrent in-situ polymerization or cure of the carrier material. Any of the known methods for encapsulating a liquid may be employed including techniques based on interfacial polymerization, coacervation, and the like.

The amount of curative to be incorporated into the carrier depends upon the specific curative or curatives to be employed and the curable composition with which it is be used, the method by which initiation of cure of the curable composition is to be accomplished, the anticipated weight ratio of curable composition to encapsulated cure system and, as noted above, whether the curative also participates in or is consumed by the cure or polymerization of the carrier material and/or shell wall. Generally speaking, the amount of curative will be consistent with those levels typically used to effectuate cure of the given curable composition. However, where the process by which the carrier and curable composition are mixed involves intimate mixing, e.g., repetitive kneading or mastication, it is often possible to employ lower levels of the curative for the same volume of curable composition than would be used with traditional (including traditional encapsulated) forms of the curable compositions, due to the more efficient exposure of the curative to the curable components.

When the encapsulated curative is to be employed in addition polymerizable curable compositions, the curative will be present in an amount of from about 0.1 wt. percent to about 25 wt. percent, preferably from about 1 wt. percent to about 20 wt. percent, most preferably from about 5 wt. percent to about 15 wt. percent of the carrier. Higher amounts are also contemplated; however, with such higher amount, less of the encapsulated carrier will be incorporated into the curable composition for a given particle size. Alternatively, it may be desirable to use such higher amount without changing the amount of the encapsulated curative where the level of curative is directly related to the cure speed and a higher than normal cure speed is desired. For example, extremely high-speed industrial applications may be such that cure must be instantaneous or nearly instantaneous.

Where the curative is a cross-linking or hardening agent, typically employed with step growth polymerization reactions, the amount of such curatives in the microcapsules will be considerably higher. Such curatives will typically be present in an amount of from about 2 wt. percent to about 50 wt. percent, preferably from about 10 wt. percent to about 30 wt. percent, most preferably from about 15 wt. percent to about 25 wt. percent of the carrier. More importantly, the amount of these curatives typically is dependent upon the stoichiometry requirements for the curable composition and the degree of cross-linking, as appropriate, that may be desired. Thus, higher or lower amounts may be used in the carrier particles with proper adjustment of the amount of carrier particles to be incorporated into a given amount of curable composition.

Generally speaking, the encapsulated carrier microparticles of the present invention serve as microdomains of the curing agent in a highly concentrated amount. Where the curative also serves as the curative for the carrier and/or the microcapsule walls, the curative is typically incorporated at a level that is at least 2 times, preferable at least 5 times and most preferably at least 10 times that necessary for effectuating cure of the carrier and/or wall material. In this instance, the amounts recited in the prior two paragraphs refer to the amount of curative following polymerization and/or cure of the carrier and/or cell wall, as appropriate.

The particle size of the encapsulated cure system of the present invention may vary widely depending upon the intended end-use application, the method by which the cure of the curable composition with which they are to be used is initiated and the constraints of the method by which the particles are formed. Typically, the volume weighted median particle size will range from about 2 microns to about 200 microns, preferably from about 5 microns to about 50 microns, most preferably from about 10 microns to about 20 microns. Volume weighted median particle size is determined using an Accusizer 788, made by Particle Sizing Systems of Santa Barbara, Calif.

Encapsulation of the carrier complex may be by any means known in the art. While the following discussion is predominately directed towards the encapsulation of the carrier, the same is equally applicable to the encapsulation as discrete microcapsules or domains of other components of the curable compositions, including, specifically, the liquid curable components as discussed further below. Suitable techniques include coacervation, in-situ polymerization, interfacial polymerization, air suspension, centrifugal extrusion, spray drying, pan coating, and by forming a dispersion of core material and shell material and applying a pressure shock wave to the dispersion as described in Redding Jr. (U.S. Pat. No. 5,271,881, incorporated herein by reference). The specific selection of the method and the materials depends upon the nature, including the physical state and/or chemistry, of the material to be encapsulated, e.g., whether the carrier material is in a liquid form or a solid, semi-solid or gel-like particulate form. Exemplary methods and materials are set forth in the following paragraphs as well as in, for example, Schwantes (U.S. Pat. No. 6,592,990), Nagai et. al. (U.S. Pat. No. 4,708,924), Baker et. al. (U.S. Pat. No. 4,166,152), Wojciak (U.S. Pat. No. 4,093,556), Matsukawa et. al. (U.S. Pat. No. 3,965,033), Matsukawa (U.S. Pat. No. 3,660,304), Ozono (U.S. Pat. No. 4,588,639), Irgarashi et. al. (U.S. Pat. No. 4,610,927), Brown et. al. (U.S. Pat. No. 4,552,811), Scher (U.S. Pat. No. 4,285,720), Shioi et. al. (U.S. Pat. No. 4,601,863), Kiritani et. al. (U.S. Pat. No. 3,886,085), Jahns et. al. (U.S. Pat. Nos. 5,596,051 and 5,292,835), Matson (U.S. Pat. No. 3,516,941), Chao (U.S. Pat. No. 6,375,872), Foris et. al. (U.S. Pat. Nos. 4,001,140; 4,087,376; 4,089,802 and 4,100,103), Greene et. al. (U.S. Pat. Nos. 2,800,458 and 2,730,456), Clark (U.S. Pat. No. 6,531,156), Saeki et. al. (U.S. Pat. Nos. 4,251,386 and 4,356,109), Hoshi et. al. (U.S. Pat. No. 4,221,710), Hayford (U.S. Pat. No. 4,444,699), Hasler et. al. (U.S. Pat. No. 5,105,823), Stevens (U.S. Pat. No. 4,197,346), Riecke (U.S. Pat. No. 4,622,267), Greiner et. al. (U.S. Pat. No. 4,547,429), and Tice et. al. (U.S. Pat. No. 5,407,609), among others and as taught by Herbig in the chapter entitled "Encapsulation" in Kirk Othmer, Encyclopedia of Chemical Technology, V.13, Second Edition, pages 436-456 and by Huber et. al. in "Capsular Adhesives", TAPPI, Vol. 49, No. 5, pages 41A-44A, May 1966, all of which are incorporated herein by reference.

The first step in the encapsulation process is the preparation of the discrete particles, domains or beads of the carrier material or carrier precursor materials. Where such materials are in solution or liquid form and the encapsulation is to be by way of, e.g., coacervation, interfacial polymerization, etc., the solution or liquid containing the carrier or carrier precursor material is subjected to high shear mixing or agitation to create a suspension, emulsion or colloidal system of discrete domains of the carrier or carrier precursor of the requisite size. Where the carrier is a heat sensitive material, e.g., a wax or wax-like material, the carrier, with the therein incorporated curative, is heated above its melt temperature and then subjected to a similar high shear mixing or agitation in a liquid medium, preferably water, to create discrete droplets of the carrier and then cooled to allow the solid particles to form, before encapsulating. Where the curative is incorporated into a solid or substantially solid carrier, the carrier may be ground and sorted to the desired particle size before encapsulation. Such methods, as well as additional alternative methods for preparation of the particles or discrete domains for encapsulation are widely used in industry and well known to those skilled in the art.

One preferred microencapsulation technique is coacervation wherein the material to be encapsulated is dispersed or emulsified in a liquid solution of the material to be used as the wall material. The solution is perturbed to cause a phase separation of the wall material, or at least a portion thereof, from the solvent with all or some of the wall material coating the dispersed material to be encapsulated. In this process, the wall forming material may directly separate out onto the emulsified or dispersed core material or it may form its own emulsion with the droplets of the wall material subsequently depositing on the droplets of the core material. In either case, the liquid wall material deposits itself as a continuous coating about the dispersed droplets of the internal phase or capsule core material and the wall material is then solidified. Solution perturbation can be any that affects the solubility of the wall material including changes in temperature and addition of another solvent, including, for example, the addition of a non-solvent for the wall material. It should be readily understood by those skilled in the art that the foregoing may be accompanied by a pH shift with wall materials such as gelatin to promote the phase separation in the wall formation step, as taught in Green (U.S. Pat. Nos. 2,800,457 and 2,800,458, incorporated herein by reference).

In coacervation encapsulation, the material to be coated is typically a liquid and is emulsified in the solvent to form droplets that are then coated with the wall material. Oftentimes it is advantageous to also employ an emulsification agent to assist with the emulsification of the carrier materials or precursors thereof. Preferred emulsification agents that can be used are amphiphilic, that is, they contain both hydrophilic and hydrophobic groups in the same molecule. Exemplary emulsification agents include, but are not limited to, partially hydrolyzed polyvinyl alcohol, starch derivatives, cellulose derivatives, polyacrylamide, and the like. A preferred emulsification agent for use in the invention is partially hydrolyzed polyvinyl alcohol. In a preferred method, high shear agitation is provided to the aqueous mixture to achieve a droplet size of less than about 250 microns, preferably less than 100 microns.

The conditions for encapsulation will vary based upon the choice of the material used for encapsulating the carrier complex or, as appropriate, other components of the curable composition. Selection of the encapsulating composition or materials depends upon a number of factors including the desired properties of the shell wall to be formed, the chemical composition and state of the material to be encapsulated or, in the case of a carrier to be cured or polymerized in-situ after or concurrent with formation of the shell wall, the carrier precursor materials, including the curative, and the method employed for the encapsulation process. Desired properties of the shell wall include strength, breakability, and impermeability, at least with respect to the curative in the case of the encapsulated carrier complex, particularly where the carrier is of a composition that allows for the migration of the curative within the carrier or the blooming of the curative from within the carrier. Suitable materials for forming the polymer shell include any of those know in the art for encapsulation, particularly the encapsulation of liquid droplets or solid particles. Exemplary shell wall materials include natural materials such as gelatin, gum arabic, starches, sugars, shellac, and rosin; cellulose derivatives, such as ethyl cellulose and carboxymethylcellulose; paraffin; tristearin; polymers such as polyvinyl alcohol, polyethylene, polypropylene, polystyrene, polyacrylamides, polyethers, polyesters, polyamides, polybutadiene, polyisoprene, silicones, epoxies, and polyurethanes; formaldehyde resins such as reaction products of formaldehyde with phenols, urea, and melamine; and copolymers such as polyurethane copolyethers. Polyvinyl alcohol is a preferred wall material for use in coacervation encapsulation. Specific shell wall materials will be described in greater detail below.

The shell wall may be a rigid material or a flexible material so long as the wall ruptures under the conditions for initiating polymerization, curing or cross-linking of the curable composition. For the purpose of this application, it is understood that reference herein to "initiation" or "initiating" polymerization, curing or cross-linking includes that step where the curative is brought into direct contact with or otherwise made available to the polymerizable components of the curable composition, regardless of whether actual polymerization, curing or cross-linking is concurrently effected. For example, in activated anaerobic curable compositions, the polymerization is 'initiated'; however, polymerization is inhibited due to the presence of oxygen. Similarly, a heat-activated curative may be intimately mixed with the curable component of the curable composition, but polymerization does not occur until the proper temperature is attained to effectuate heat activation. In essence, but for the absence of a physical or environmental condition or a chemical co-reactant which is inherently supplied by the substrate upon which the adhesive is applied or to be applied, polymerization or cure would commence.

The thickness of the shell wall may vary widely and may range from an extremely thin film that provides no or little structural effect but merely serves as an impermeable or low permeability barrier for the curative to a shell wall having structural integrity of its own. Such thin walls are particularly suitable for those curing systems wherein the carrier is a stiff or rigid material. Alternatively, thicker shell walls may be employed, especially where the microcapsules during the formulation or application of the adhesive or sealant composition or the substrates to which it is applied are subject to extensive shear conditions, strong forces, excessive handling, etc. Thicker walls are also appropriate where the carrier is very soft or thixotropic in nature and, by itself, provides little or less than desired resistance to deformation.

Permeability refers to the ability of the shell wall to provide adequate protection against the ingress and/or egress of materials into or from the microcapsule that may otherwise affect the shelf life of the microcapsules and/or the adhesive or sealant formulation into which they are incorporated. Thus, the shell wall may be permeable to certain materials so long as it does not adversely affect the utility and efficacy of the microcapsules for their defined life, which life is typically three months, preferably six months or more.

Generally speaking, it is an objective of the present invention to employ thin shell walls, especially shell walls thinner than are traditionally used for or found with current microencapsulated one-part adhesive systems; though, of course, such thinner walls are not required and traditional thickness walls may also be used. However, the use of thin shell walls is especially desirable as their use means that more of the components necessary for forming the adhesive or sealant and less inert, filler material, as represented by the shell wall, are present in a given volume of adhesive or in the bond site. Typically, in accordance with the practice of the present invention, the shell wall will comprise from about 0.8 wt. percent to about 25 wt. percent, preferably from about 2 wt. percent to about 12 wt. percent, most preferably from about 4 wt. percent to about 10 wt. percent of the whole of the curing system.

Dyes, pigments, fillers, plasticizers, cross-linking agents, binding agents, and other additives can be incorporated in the capsule wall or applied to the capsule wall surface. One important parameter to keep in mind when formulating wall materials is permeability. Generally, the wall material should have low permeability, at least with respect to the material to be encapsulated. No or low permeability of the capsule wall is particularly important with respect to the curative in the carrier so as to prevent loss of the curative and premature polymerization of the curable composition. Likewise, it may be important for the capsule wall to be impermeable or of low permeability to the curable component of the curable composition so as to prevent any ingress of the same into the carrier particles. Dependent upon the encapsulated material, it may also be desirable to formulate the wall material to have low permeability to certain gases such as oxygen or low permeability to liquids such as water or solvents such as toluene or tetrahydrofuran. The requisite permeation rates will vary for each system, but can be met by judicious choice of the wall material and by degree of cross-linking of the wall material. Generally, as cross-linking increases, the permeation rate decreases.

As noted above, any or a number of different processes may be used to encapsulate the components of the curable compositions and curative complex. One preferred technique is to polymerize the capsule wall material in-situ. In this technique, monomers or oligomers are dispersed on the material to be encapsulated and then polymerization is effected by addition of a reactive species, such as a co-monomer or radical initiator, a curing agent or by heat or ultraviolet radiation. Optionally, the capsule wall material may be cross-linked in-situ by addition of cross-linking agents or by treatment with heat or ultraviolet radiation or radical initiators. The method of polymerizing or cross-linking the capsule wall material will vary based upon the choice of wall materials and based upon the material being encapsulated. A number of specific methods and shell wall forming compositions are as set forth below.

When the walls of the microcapsules are comprised of polyamide or polyurea, a preferred encapsulation technique is interfacial polymerization. This can be effected by mixing the adhesive monomer or monomers to be microencapsulated together with either an acid chloride or an isocyanate. The resultant mixture is emulsified with an emulsification agent to obtain an oil-in-water emulsion. A polyfunctional amino compound is then added into the emulsion, whereby microcapsule walls are formed around each microparticle of oil. When an acid chloride is mixed with the polyfunctional amino compound, a polyamide microcapsule is produced—when an isocyanate is used, polyurea capsules are formed. Though reference is made to microparticles of the oil phase, it is also understood that the dispersed phase is also referred to herein as "domain", "bead" or "droplet" and the like.

Acid chlorides that can be used in the invention to produce polyamide microcapsules include, but are not limited to: terephthaloyl chloride, isophthaloyl chloride, 1,3,5-benzenetricarboxylic acid chloride, sebacyl dichloride, 4,4-sulfonyldibenzoyl chloride, 1,3-benzenedisulfonyl chloride, 1,4-benzenedisulfonyl chloride, or mixtures thereof. A preferred acid chloride for use in the invention is a mixture of isophthaloyl chloride and terephthaloyl chloride.

Isocyanate compounds that can be used in the invention to produce polyurea microcapsules include, but are not limited to: 2,4- and 2,6-diisocyanatotoluene, 4,4'-diisocyanatodiphenyl methane, 1,3,5-trimethylbenzene-2,4-diisocyanate, 1,6-diisocyanatohexane, polymethylene polyphenyl isocyanate, polyisocyanates which additionally contain biuret-, allophanate-, and carbodiimide groups, and the like.

Examples of polyfunctional amines that can be used in the invention include, but are not limited to: ethylene diamine, diethylene triamine, triethylene tetramine, tetraethylene pentamine 1,6 hexanediamine, polyethyleneimine, bis-hexamethylenetriamine, and the like.

Matson (U.S. Pat. No. 3,516,941) teaches polymerization reactions in which the material to be encapsulated, or core material, is dissolved in an organic, hydrophobic oil phase which is dispersed in an aqueous phase. The aqueous phase has dissolved aminoplast resin forming materials that upon polymerization form the wall of the microcapsule. A dispersion of fine oil droplets is prepared using high shear agitation. Addition of an acid catalyst initiates the polycondensation forming the aminoplast resin within the aqueous phase, resulting in the formation of an aminoplast polymer that is insoluble in both phases. As the polymerization advances, the aminoplast polymer separates from the aqueous phase and deposits on the surface of the dispersed droplets of the oil phase to form a capsule wall at the interface of the two phases, thus encapsulating the core material. Polymerizations that involve amines and aldehydes are known as aminoplast encapsulations. Urea-formaldehyde, urea-resorcinol-formaldehyde, urea-melamine-formaldehyde, and melamine-formaldehyde, capsule formations proceed in a like manner. In interfacial polymerization, the materials to form the capsule wall are in separate phases, one in an aqueous phase and the other in an oil phase. Polymerization occurs at the phase boundary. Thus, a polymeric capsule shell wall forms at the interface of the two phases thereby encapsulating the core material. Interfacial polymerization is particularly useful for wall materials such as polyesters, polyamides, and polyureas.

Gelatin and gelatin containing microcapsules wall materials are well known and are typically used in coacervation and phase separation encapsulation processes. One preferred technique for gelatin/gum arabic encapsulation involves first emulsifying the core material into a gelatin solution to obtain an oil-in-water emulsion. The emulsion is mixed with a gum arabic solution. The system is then pH adjusted or diluted to cause the gelatin/gum arabic to coacervate. Thereafter, the capsules are post-treated with a cross-linking agent, such as formaldehyde, glutaraldehyde, or other similar known compounds.

Wall materials made of melamine-formaldehyde can be made by first emulsifying the core material into a carboxylmethylcellulose solution or a poly(styrene-maleic anhydride) solution to obtain an oil-in-water emulsion. The emulsion is then mixed with a melamine-formaldehyde precondensate solution. The system is then pH adjusted, followed by heating to initiate polymerization of the precondensate to a high molecular weight compound. The presence of the carboxylmethylcellulose or poly(styrene-maleic anhydride) solution helps the polymerized melamine-formaldehyde to deposit onto the core material surfaces, thereby encapsulating the core. An alternative method polymerizes the melamine and formaldehyde in the presence of a styrene sulfonic acid. Yet, another alternative and a preferred embodiment of the melamine-formaldehyde resin wall forming process employs polyacrylic acid and/or polyacrylic acid derivatives and the like as emulsifiers to assist in forming the oil in water emulsions. Such emulsifiers preferably have an HLB value of from about 8 to 18.

Alternatively, the wall material can be formed by free-radical polymerization and/or cross-linking. This is especially useful for wall materials such as polyvinyl chloride, polystyrene, acrylic esters (e.g. alkyl acrylate-acrylic acid copolymers), unsaturated polyesters and the like. The free radical reaction can be initiated by heat, ultraviolet radiation or by addition of initiators such as benzoyl peroxide, t-amyl peroxyneodecanoate, t-amyl peroxypivalate, t-amyl peroxy-2-ethyl-hexanoate, t-butyl peroxyisobutyrate, t-amyl perbenzoate, di-t-butyl peroxide, 2,2'-azobis(2-methylbutyronitrile), 2,2'-azobis(2,4-dimethylvaleronitrile), 2,2'-azobis(2-methylpropanenitrile), and the like.

When the walls of the microcapsules are comprised of epoxies, suitable components include difunctional or polyfunctional epoxides such as vinylcyclohexene dioxide, 3,4-epoxycyclohexylmethyl-3,4-epoxycyclohexanecarboxylate, bis-phenol-A-digylcidyl ether and the like. These can be used in combination with polyols such as glycerol. One convenient method of forming microcapsules involves forming an emulsion of the material to be encapsulated, adding a combination of the di- or polyfunctional epoxide with the polyol to coat the material to be encapsulated and then adding an acid to effect the polymerization and form the polyepoxide. Suitable acids include Bronsted acids such as hydrochloric acid or sulfuric acid and also Lewis acids such as boron trifluoride, antimony pentafluoride and the like.

The pre-applied adhesive and sealant compositions employed in the practice of the present invention may be prepared by any of the known methods for formulating and preparing pre-applied adhesive and sealants. As noted above, the key aspect according to the practice of the present invention is the use of the herein described encapsulated carrier complex.

In accordance with one embodiment of the present invention, the encapsulated curative complex is dispersed in the liquid curable composition and this liquid mixture applied to the appropriate surface area of the stock material and encapsulated or entombed in-place. As discussed in the background section of this application, this embodiment essentially comprises a pool of the liquid curable composition having dispersed therein the encapsulated curative complex encased or entombed by a cured or polymerized film of the same or a second curable or polymerizable composition such that the liquid curable composition lies between the latter and the substrate to which it is applied. These type adhesive and sealant compositions are often found on threaded assemblies or more commonly in potting or encapsulating type applications, for example, of electronic components. Here, if the film encapsulating the liquid curable composition is prematurely compromised, no or insubstantial cure occurs and the adhesive or sealant composition can be wiped clean from the stock substrate for use or re-treatment with a pre-applied adhesive or sealant.

This type of encapsulated adhesive or sealant, more typically referred to as an encased adhesive or sealant, may be formed in number of different ways. Preferably and most conveniently, the liquid curable composition of the present invention comprises a dual curing liquid curable composition wherein one mode of cure is by exposure to actinic radiation/light, especially UV light, and the liquid curable composition includes one or more actinic radiation/light, especially UV light, activated curatives whereby when the liquid curable composition is exposed to the appropriate actinic radiation or light, the liquid curable composition at and/or near the exposed surface cures thereby forming a film of the cured polymer over the bulk of the liquid curable composition. Because the actinic radiation/light energy does not penetrate into the bulk of the liquid polymerizable composition, it still remains in its uncured state.

Alternatively, the liquid curable composition containing a first polymerizable component curable by the curative of the curative complex may have incorporated therein a second polymerizable component and a curative therefore which, when exposed to curing conditions for said second polymerizable component and associated curative, forms a film over the bulk of the liquid curable composition. In this instance, it is preferred that cure of the second polymerizable component is also affected by the curative of the curative complex so as to ensure that the second polymerizable within the bulk of the liquid curable composition is also cured upon cure of the first polymerizable component and/or that the second polymerizable component is incompatible with and of lower density than the first polymerizable component so that it separates therefrom (much like oil and water) forming a liquid film of the second polymerizable component overlaying the bulk of the liquid curable composition before cure of the second polymerizable component is affected. So long as the curative for the second polymerizable component is not effective for affecting cure of the first liquid curable component, essentially any cure mechanism can be employed; however, it is preferred that the curative for the second polymerizable component be actinic radiation/light, preferably UV light, activated and cure of the second polymerizable component be effected by exposure to the appropriate level and form of actinic radiation/light, most preferably UV light.

Finally, yet another alternative method for encapsulating, by way of encasing, a liquid curable composition containing an encapsulated curative complex on the surface of a stock material is by applying the curative complex containing liquid curable composition to the stock material and thereafter coating that liquid curable composition with a second, liquid film-forming composition and effecting cure of the latter. The film forming composition may be curable, polymerizable or in solution. In the latter, cure involves merely allowing the solvent to evaporate, thereby leaving a film of the composition on the liquid curable composition. Where the film of the film-forming composition is formed by cure, polymerization or cross-linking, so long as the curative for the second polymerizable component is not effective for affecting cure of the first liquid curable component, essentially any cure mechanism can be employed. However, it is preferred that the curative for the second polymerizable component be actinic radiation/light, preferably UV light, activated and cure of the second polymerizable component be effected by exposure to the appropriate level and form of actinic radiation/light, most preferably UV light. This process is especially suited for those stock materials where the pre-applied adhesive is applied to a recess such as between the threads or a threaded element or a blind hole.

Most preferably, the pre-applied curable compositions of the present invention comprise microcapsules of both the curative complex and, as a separate constituent, microcapsules of the polymerizable component or composition. Typically, the encapsulated materials or microcapsules, as they are often referred to, are dispersed in and held to the surface of the stock material by an appropriate binder. The choice of the binder will depend upon a number of factors including the composition of the wall material and the substrate to which they are to be applied, the environment in which they are to be applied and/or used, and the method by which the pre-applied adhesive is to be applied to the surface of the stock material.

As noted above, in preparing the adhesive and sealant compositions for application to the stock material the capsules are dispersed in a binder material. It is possible that each type of microcapsules may be dispersed in a separate portion or component of the binder system and then combined, each may be added sequentially to the binder system or they may be added concurrently. Because of the use of the carrier complex, concerns of premature curing due to fracturing of the microcapsules during preparation are lessened, if not eliminated; however, it is still desirable to minimize the shear forces exerted on the microcapsules, especially those containing the liquid curable component. This becomes more of an issue with higher viscosity binder systems as opposed to the low viscosity binders comprising a polymer binder in solution.

The binder system may be a curable binder system using the same or similar curable or polymerizable materials as are useful for forming the shell wall and/or the adhesive or sealant. Suitable curable binder systems include those based on the reaction of an anhydride and arylenes, alkylenes, alkoxylenes, alkarylenes, aralkylenese, alkoxyalkylenes, aryloxyalkylenes and aryloxyarylenes.

Alternatively, suitable binders also include water-soluble binding agents such as polyvinyl alcohol, styrene-maleic anhydride copolymers and gelatin as well as solvent soluble binding agents such as chloroprene, polyester acrylates, urethane acrylates, carboxyl- or hydroxy-modified vinylchloride-vinylacetate copolymer, cellulose actetate, epoxides, polyterpenes, hydroxypropylcellulose, hydroxyethylcellulose, sodium carboxymethylcellulose, poly(glycolic acid), poly(lactic acid), copolymers of the foregoing, poly(aliphatic carboxylic acids), polycaprolactone, poly(acetals), poly(lactic acid-caprolactone), poly(glycolic acid-caprolactone), polyanhydrides, albumin, casein, butyrate resins, polyvinylacetate, polyesters of dibasic acids and diols, polyvinylchloride, polyvinylbutyral, polyvinyl formal, varnish-based and tar-base resins, and waxes and the like. Organic solvents for the latter include chlorinated solvents such as trichloroethylene, trichloroethane, methylenechloride; chlorinated/fluorinated hydrocarbons solvents such as monofluorotrichloroethane and dichlorodifluoroethylene; hydrocarbon solvents such as hexane, and pentane; alcohols such as ethanol and isopropanol, and lacquer solvents such as methyl ethyl ketone, toluene, and benzene.

Additional binder systems are disclosed in, for example, Park et. al. (U.S. Pat. No. 5,827,924), Matsuo (U.S. Pat. No. 6,025,074), and Bachmann et. al. (U.S. Pat. No. 3,814,156), herein incorporated by reference and elsewhere and are well known to those skilled in the art.

Particularly desirable binder systems are those that are photopolymerizable, i.e., cure or polymerize upon exposure to light, preferably UV light. Such binder systems may comprise any of the above-mentioned free-radically curable monomers, oligomers and/or pre-polymers and an appropriate photoinitiator therefore and/or a photosensitizer. Suitable photoinitiators include, among others, benzoin and its derivatives, benzophenones and their derivatives, xanthones, benzyl, benzilketals (especially benzildimethylketal), acetophenones and their derivatives (especially α,α-diethoxyacetophenone), α-hydroxyalkylphenones, o-acyl-α-aminoketones, acylphosphine oxides especially 2,4,6-trimethylolbenzoyldiphenyphosphine oxide) and acylphosphonates. Additional photoinitiators include substituted pyrylium salts or anthracene and derivatives thereof, e.g., substituted anthracenes, or anthraquinone or ketocoumarine derivatives. Photoinitiators are typically used in an amount within the range of about 0.5% to about 10% by weight of the composition, with about 2% to about 4% or greater by weight of the total composition being desirable. Alternatively or in addition, the photopolymerizable binder may include a photosensitizer. Suitable photosensitizers include benzophenone or dyes like eosin, fluorescein, thiazole dyes, thiazine dyes, oxazine dyes, azine dyes, aminoketone dyes, xanthene dyes, acridinium dyes or phenazine dyes. Inclusion of such photosensitizers often lessens the intensity and/or duration of exposure to the radiation used to initiate cure. As a general guide, for photoinitiated polymerizations, it is also desirable to use a photoinitiated radical generating component, such as peroxides, peresters, azo compounds, benzoin derivatives, alpha-halo acetophenones, or acylphosphine oxides, in an amount within the range of about 0.005% to about 4% or greater (desirably within the range of about 0.01% to about 1.5%) by weight of the total composition.

Though the foregoing discussion has been primarily with respect to free-radical photopolymerization, it is also understood that suitable binder systems may be photoionically activated as well. Suitable cationic photoinitiators include the iodonium salts, especially the diaryliodonium salts. Such iodonium salts are described in U.S. Pat. Nos. 3,729,313; 3,741,769; 3,808,006; 4,250,053 and 4,394,403. The iodonium salt can be a simple salt, containing an anion such as chloride, bromide, iodide, antimony pentafluoride or arsenic hexafluoride or the like. Mixtures of iodonium salts can be used if desired. Typically the iodonium cationic photoinitiators are used in combination with a sensitizer and an electron donor compound. Accordingly, selection of a particular iodonium salt may depend to some extent upon the particular polymerizable component, sensitize and donor chosen.

The binder compositions may also include other ingredients including curatives and additives for the adhesive or sealant composition provided that in the case of curatives, the curative contained in the binder is not such that premature rupture of the microcapsules containing the curable components of the curable compositions will allow premature curing or polymerization thereof. Thus, for example, an accelerator may be dispersed in the binder so long as the initiator for the given curable composition is in the carrier.

The amount of the encapsulated components to be incorporated into the binder varies depending upon the method and rate of application, the nature and/or composition of the binder, and the amount of adhesive or sealant material needed to effectuate the desired bond or seal. Binders comprising a binder polymer in solution will generally have lower levels of the encapsulated components than liquid curable binder systems. For example, the binder in solution based pre-applied adhesive and sealant compositions may comprise less than about 30%, preferably less than about 25%, or the binder, based on the total weight of the binder solids and encapsulated materials. On the other hand, with 100% solids binders, e.g., UV curable binders, the binder may comprise about 40% or more, preferably about 45% or more of the 100% solids binder, based on the total weight of the binder and encapsulated materials. Typically, it is preferred to minimize the amount of binder material while concurrently maximizing the amount of the curable composition to allow for the most efficacious bond or seal. Generally speaking, the amounts will be consistent with those used with conventional encapsulated adhesives and sealants. As to the ratio of encapsulated carrier complex to encapsulated liquid curable component, that ratio depends upon a number of different parameters including the type of curable composition, i.e., whether it is an addition polymerizable system or a step growth polymerization system; the degree of polymerization or cure desired; the amount and/or stoichiometry of the curable components, the amount of curative in the carrier particles, and the like. Those skilled in the art will readily recognize or be able to determine the proper level of incorporation. Most often one would employ that amount of encapsulated carrier complex particles which contains the same amount of curative as would be employed were the carrier not present, i.e., in a traditional encapsulated system.

The encapsulated adhesive and sealant compositions may be applied to the stock materials by any conventional process using conventional "converting" or application equipment and machinery. Exemplary methods include, without limitation, roll coating, painting, dry-brushing, dip coating, spraying, slot-coating, swirl spraying, printing (e.g., ink jet printing), extrusion, flexography printing, gravure printing, screen printing, stencil printing and the like. The specific method and equipment depends upon a number of factors such as the nature and type of stock material to be converted; the nature of the adhesive or sealant composition to be applied; the size, shape, placement, pattern, amount, etc. of the adhesive or sealant to be applied; the method of cure of the binder; etc. Those skilled in the art will readily recognize suitable application methods and apparatus for their particular application.

In the case of stock materials in the nature of threaded elements, e.g., nuts, bolts, screws, pipes, pipe fittings, and the like, the adhesive may be applied by spraying, dip coating, brush application, transfer application (e.g., from a drum roll) or directly from a dispenser nozzle. Similar application methods may be employed for stock materials for retaining and/or blind hole bonding applications; however, certainly, some of these methods would only apply to the application of the pre-applied adhesive to the blind holes or keyways of a female connector whereas others may only apply to the application of the pre-applied adhesive to the piston of the male connector. For example, dip coating would apply to the latter but not the former. Similarly, dispensing by a nozzle would apply to the former but not typically the latter. Suitable apparatus for the application of the liquid curable composition are taught in, for example, Neville (U.S. Pat. No. 4,528,938) and Organza (U.S. Pat. No. 4,353,325), both of which are incorporated herein by reference.

Similarly, those skilled in the art will readily recognize appropriate methods of applying the liquid curable compositions to various stock materials, especially where the surface to which the liquid curable composition is to be applied is a flat or substantially planar bonding surface that is to be activated by manual or automated means. For example, with trim, laminates, magnets, packaging stock and the like, the liquid curable composition may be applied in any number of particular patterns or specific designs, shapes, profiles, etc., depending upon the specific stock material and its application. Such patterns, designs, etc. may be achieved by the various methods noted above, especially the printing methods previously noted including screen or stencil printing, gravure printing, flexography printing, roll coating, slot coating, etc. Alternatively, the pre-applied adhesive may be laid down on the stock material surface by spraying, brushing, nozzle dispensing, extrusion, etc.

In the preferred embodiment, the adhesive or sealant composition will be applied in-line in a high-speed industrial converting process whereby the stock materials are prepared/converted for end-use using conventional equipment. In this respect, the adhesive or sealant application will be one of possibly several workstations in the conversion process. Here if problems are encountered in the application process, the actual manufacturing process in which the stock materials are to be used will not be affected and the affected stock materials can be removed before they find their way to their end-use application. Such conversion processes may be continuous or discontinuous, i.e., stop and go, to allow for each workstation to complete its intended task. In particular, the following or a subsequent workstation will be that which allows for the cure or the binder composition so that the pre-applied adhesive or sealant is securely bonded to the stock material and dry-to-the-touch or substantially so. Following converting, the stock materials made in accordance with the practice of the present invention are stored at the conversion site or shipped and stored in a storage facility or at the point of end use until needed.

As noted earlier, activation of the pre-applied adhesive or sealant is achieved through a high shear mixing or, in the case of a carrier which flows upon exposure to heat, moderate shear mixing combined with heating. Because of the unique physical characteristics of the carrier, most conventional processes for activation pre-applied adhesive and sealants (e.g., press fit, finger pressure, single roll or blade press) will not be sufficient to expose or make available sufficient amounts of the curative to effectuate adequate cure of the curable composition. While some release and cure may be found, such would likely be only sufficient to provide a tack bond or a slight viscosity increase in the curable composition. Instead, there must be sufficient kneading of the carrier complex and the curable components to ensure full activation. By creating and using pre-applied adhesives and sealants which require a higher threshold of mixing to activate, one is able to avoid problems of premature curing, unintended bonding and the like oftentimes found with conventional pre-applied materials.

Activation of the pre-applied adhesive or sealant may be accomplished manually or by an activator means, i.e., an apparatus or machinery. If manual, a blade or other like instrument will have to be repeatedly scored over the pre-applied adhesive or sealant composition with sufficient pressure to rupture the microcapsules and mash or masticate the carrier so that sufficient curative is exposed to the liquid curable components in the case of stock materials wherein the adhesive is applied to a planar surface thereof. For threaded assemblies, the mere threading process should be sufficient in most instances to shear and mix the components of the pre-applied adhesives and sealants; however, if the threaded element is such that less than a full turn is allowed, then the threaded element should be threaded and unthreaded a couple of times to ensure proper activation. Similarly, for retaining and blind hole bonding applications, if the extent of movement in mating the two parts is insufficient to properly activate the curable composition, it may be necessary and preferable to rotate the one component relative to the other and/or withdraw and reinsert the elements a few times to ensure that sufficient curative is made available to the curable composition. Generally speaking, simple trial and error will allow one to quickly ascertain the degree of threading needed with any particular threaded stock material as well as the added movement needed with any particular retaining or blind hole bonding application.

In the preferred embodiment, particularly where the pre-applied adhesive has been applied to a substantially planar or flat bond surface, e.g., a flange or other relatively flat surface area of the stock material, activation of the pre-applied adhesive and sealants will be achieved through an automated activator means, either a stand alone apparatus or machinery that activates the pre-applied adhesive or sealant or one that is integrated into a larger industrial assembly or manufacturing process. Though there is a large zone of overlap in terms of when each may be used, where the cure speed of the activated curable composition is very fast, on the order a second or less, in-line automated activation and assembly will be needed. Slow cure speeds, e.g., where there is a long open time, are especially beneficial when the activator means is a standalone apparatus or where the subsequent assembly step is a manual step as opposed to an automated step. For example, portable activators may be desirably employed where the bonding or assembly is to take place in the field at the site of assembly and installation as opposed to in an industrial assembly operation.

With an in-line activator means, the activator means may be stationary or attached to or part of a robotic arm or like apparatus. In the latter situation, which is especially suited to allow for its use with non-planar stock materials, the activator means is capable of movement from an active mode where it is in-line in the activation workstation and an idle mode where it is off-line and retracted from the actual working site of the activation work station. Alternatively, the latter situation may be such that the activator means, during the activation step, is not stationary relative to the assembly line apparatus but moves such that the activator passes over or swipes across those sections of the stock material to which the pre-applied adhesive is applied as the stock material passes through the work station, either in a continuous or discontinuous fashion. In either respect, these apparatus are directly integrated into the assembly line and, for existing lines, can replace those workstations that previously applied a liquid or flowable adhesive and, if present, cured the same. A particular benefit, especially where the stock material is flat or is such that it allows for the activator means to act upon the pre-applied adhesive or sealant without movement thereof, even as the stock material traverses through the activator workstation, is that the process can be continuous and of such speed as the remainder of the assembly line allows. Thus, these stock material are suitable for high-speed, including extremely high-speed operations. Exemplary of such an operation would be a packaging operation where the paperboard blanks traverse through the assembly line at speeds of up to 300 feet per minute and higher. Even with less than optimal activation, rates of up to 250 feet per minute or more can be successfully attained. Such high rates of assembly are in marked contrast to most traditional, automated assembly operations which only achieve rates on the order of 150 feet per minute or so.

Perhaps the key aspect of the activator means is that portion thereof which directly contacts and activates the pre-applied adhesive or sealant, i.e., the activator head. The design, construction and nature of the activator head may vary widely depending upon the composition and properties of the carrier and the cure characteristics, composition and make-up of the pre-applied adhesive or sealant. For example, if the carrier is a hot melt, a wax material or another heat sensitive material, the activator head will be heated, either by conductance from an adjoining heating element or through the integration into the activator head itself of a heating element, so that the carrier may be transformed to a melt or softened or flowable state. In this state, the curative in the carrier is more readily available to the remainder of the curable composition such that only moderate shear and/or mixing is needed to effectuate cure of the curable composition.

In its simplest of embodiments, the activator head will comprise a blade or series of blades where the edge of the blade is at a slight angle to the surface of the stock material upon which the adhesive or sealant is pre-applied such that as the blade traverses the stock material, or in the case of a stationary blade(s) the stock material passes the blade(s), the microcapsules containing the curable components and the carrier complex are crushed and mashed. Preferably, to ensure proper activation, the blade(s) vibrates, reciprocates or oscillates such that there is rapid lateral or circular motion relative to the path of the blade or the stock material, as appropriate. This supplemental motion of the activator blade is especially important where a single blade is employed, but is also beneficial when two or more successive blades are employed. Preferably, as the line speed increases, the frequency or speed of the supplemental motion is also increased to ensure adequate mixing.

The preferred activator head is one whose work face, i.e., that surface of the activator head opposing the surface of the stock material to which the pre-applied adhesive or sealant has been applied, has a plurality of features protruding from the surface thereof, which features, in operation, essentially disrupts and fractures the microcapsules containing the adhesive or sealant while intimately mixing and/or subsequently intimately mixing the components of the adhesive or sealant before collecting and redepositing the activated adhesive or sealant. Such features may comprise a series of ridges, dams, pyramids, and/or bumps and the like. The dams serve to mobilize and direct the placement of the pre-applied adhesive or sealant as well as knead and mix the same. In essence, the action of these elements is much like that of a plow blade on a snowplow when plowing a snowy surface. The other protrusions, e.g., bumps, ridges, pyramids and the like, which typically follow the dams, create flow shear, redirecting the movement of the adhesive or sealant in a defined area; thus, increasing the kneading and mixing thereof. Following these mixer elements will be another dam or series of dams that amasses and, if appropriate, divides the activated adhesive or sealant, leaving the same in a raise bead or a series of parallel raised beads on the surface of the stock material. Should it be desired to have a broader band of adhesive or sealant, the work face may be constructed so that it is at a slight angle to the surface of the stock material so that the gap between workface and the stock material is larger at the front, i.e. where the adhesive first contacts the work face, than at the tail, where the adhesive leaves the work face. Thus, as the adhesive passes along the last dam, the work face flattens out the bead to form a band of activated adhesive or sealant. Alternatively, this same result may be achieved by the use of a series of channels in the work surface that collect and amass the activated adhesive or sealant composition. These channels may have a high peak or their depth may taper so as to provide a broader bead or band of adhesive or sealant. Similarly the width of the channels may be varied to provide wider or narrower beads or bands of activated adhesive or sealant. A suitable activator means is disclosed in the US patent application of John Lazar et. al. entitled "Activator Means for Pre-Applied Adhesive" filed on the same date as this application, the contents of which are hereby incorporated herein by reference.

The activator head, especially the work face thereof, will also vary in its dimensions. Certainly, the width of activator head will be at least that needed to ensure that all of the pre-applied adhesive is subjected to the work face. The depth or length of the activator head, and thus the work face, will depend upon the residence time desired for the given curable composition, i.e., that length of time that the curable composition is to be subjected to the kneading and mixing forces. Certainly a key parameter to be considered when designing the activator head and, thus, the work face, will be the properties of the carrier and the amount of shear and mixing needed to ensure that sufficient curative will be exposed to and made available to the liquid curable components. Of course, for automated assembly line operations, the speed of the assembly line, especially of the stock materials through the activator means, will also play a role in determining the final, optimal design for the work face.

Generally speaking, the activator means will be such that it maintains a constant or substantially constant gap or distance between it and the stock material upon which it acts. In this respect, the activator means may have a means for sensing variations in the thickness or surface of the stock material so that a corresponding vertical movement of the activator means is made to keep the work face in its proper alignment with the surface of the stock material. This is especially important in those apparatus where activation involves the mobilization of the pre-applied adhesive or sealant on the surface of the stock material. If, for example, the distance between the tops of the dams and the surface of the stock material is greater than the height of the pre-applied adhesive or sealant there will be no mixing or activation of the adhesive or sealant. If the distance is less than half the thickness of the pre-applied adhesive or sealant, there may be insufficient mixing to provide a good bond or seal. Thus, it is desired and intended to maintain contact or as close proximity as possible between the work face and the surface of stock material. For example, it may be possible to employ tension means e.g., springs, to maintain contact or near contact of the activator head and the stock material surface.

As noted previously, the activator means, particularly the activator head may be heated where the curable composition and/or the carrier, as appropriate, is heat sensitive, i.e., requires heat to cure or release the curative, respectively. However, such heated activator means may also be advantageous in all applications, regardless of the heat sensitivity of the curable composition or carrier. Specifically, it has been found that heat in the activator means, preferably localized at the activator head, helps prevent accumulation and/or agglomeration of the curable composition on the activator head itself. Not intending to be bound by any theory; however, it is believe that the heat helps lower the viscosity of the liquid components so as to improve the flow of the curable composition past and through the various elements of the activator head. In this respect, it is conceivable that the pulverized binder materials and/or the shell walls act as a filler in the liquid components, thickening the same, which thickening effect is counteracted by increasing the temperature of the same. Heating in this respect may be by such means as previously mentioned or through other means including induction heating and/or ultrasonic heating, e.g., by use of an ultrasonic horn. Because it is desirable to minimize heating in the processes and methods of the present invention, if possible, such heating is most preferably localized in the immediate region of the activator head.

In addition to the activator means discussed above, the apparatus of the activation workstation or the immediately following workstation of the automated assembly line may be further modified to include a heating means which applies heat to the work surface of the stock materials, preferably from that side opposite the surface carrying the adhesive, to help accelerate cure or effectuate cure in the case of adhesive compositions that are heat activated/cured. The heating means may comprise an anvil which acts as a back support to that portion of the stock material where the adhesive is being worked during and subsequent to activation. In packaging applications, the heating means may also be incorporated into the guide elements that help fold and close the flaps of the packaging material and bring them into contact for effectuating closure of the same. Yet another alternative would be to include a heating means which heats air that is then directed to the work surface or the opposing side of the work surface so as to heat that portion of the stock material underlying the adhesive. Generally speaking, any number of heating means, including those often used for in-line printing, may be incorporated into the activation and assembly apparatus employed in the practice of the present invention and will be readily recognized by those skilled in the art.

The stock materials of the present invention and the methods for the production and use thereof have a number of improved attributes and benefits as compared to like stock materials using conventional pre-applied adhesive and sealants as well as compared to other assembly and manufacturing processes using other conventional adhesive and sealants, whether pre-applied or not. Many of these have been discussed or mentioned previously or are readily apparent and inherent from this specification.

From the perspective of the stock materials, it is clear that as a result of the use of the carrier complex, many stock materials not suited for use with traditional encapsulated adhesives and sealants may not be used in a pre-applied context. Furthermore, in all stock material applications, these stock materials are more stable due to the rigidity or stiffness of the encapsulated carrier complex and the lack of release of the therein-contained curative even upon rupture of the shell wall. Thus, these stock materials may be employed in applications and handled in ways that would not be possible for traditional encapsulated adhesives without cure or pre-mature activation. Finally, because of the higher strength or rigidity/stiffness of the encapsulated carrier complex, these microcapsules serve as a spatial protector for other encapsulated components of the curable composition. While such higher strength may be attributed, in whole or in part, to the shell wall, it is also important to recognize that the present invention is applicable to shell walls having little structural integrity or strength as well. Specifically, depending upon the carrier material, the structural integrity of the encapsulated cure system microcapsules may well be attributed to the encapsulated carrier itself. In such circumstance, there is little concern relative to the premature fracturing or rupturing of the cell wall since the curative within the carrier is still not available. This allows one to use thinner shell walls for the liquid curable components, thus, providing more liquid curable material for a given amount of adhesive or sealant.

From the perspective of industrial applications, especially high-speed assembly and manufacturing operations, the present invention allows one to substitute a pre-applied stock material for a live adhesive or sealant application process. In this respect there are no free liquid adhesives and no adhesive dispensers to gum up or contaminate the articles being manufacture or the apparatus of the assembly line itself. Additionally, stock materials in which the pre-applied adhesive or sealant of the present invention are inappropriately applied may be removed from service before ever reaching the assembly line. This translates into huge savings for manufacturers who may otherwise have to shut down an assembly line, if not a whole plant, where problems are encountered with the liquid adhesives as well as hot melt adhesives.

The following non-limiting working examples exemplify and provide additional scope and understanding to the present invention.

A number of novel pre-applied adhesive compositions comprising the encapsulated curative complex, encapsulated liquid curable materials and the binder for adhering the microcapsules to the stock material surface were prepared for demonstrating the utility of the present invention. Table 1 sets forth a listing of the various materials employed in making the pre-applied adhesives.

TABLE 1

Materials Guide

| Tradename | Acronym | Chemical Description | Source Company | |
|---|---|---|---|---|
| Acrysol TT-615 | | acrylic alkali thickener | Rohm & Haas | Philadelphia, PA |
| C-121 | PAA | polyacrylic acid colloid | | |
| | CHP | cumene hydroperoxide | Atofina Chemicals | Philadelphia, PA |
| CN 104 | | epoxy acrylate | Sartomer Company | Eaton, PA |
| CN 307 | | polybutadiene diacrylate | " | " |
| CN 551 | | amine modified polyether acrylate oligomer | " | " |
| CN 501 | | amine modified polyether acrylate oligomer | " | " |
| CN 2404 | | metallic acrylate oligomer | " | " |
| Cycat 500 | | sulfonic acid catalyst | Cytec Industries | West Patterson, NJ |
| CYM M-100 | | 3,4-epoxycyclohexylmethyl methacrylate | Daicel Chemical | |
| Cymel 385 | | partially methylated methylol melamine resin sol'n | " | " |
| CALFAX DBA-70 | | dodecyldiphenyloxide disulfonic acid | Pilot Chemicals | Sante Fe Springs, CA |
| | DEGDMA | diethylene glycol dimethacrylate | | |
| Disparlon 6650 | | polyamide thixotropic agent | King Industries | Norwalk, CT |
| | DNNDSA | dinonyl naphthalene disulfonic acid | | |
| | EHDMAB | ethylhexyl dimethylamino benzoate | | |
| | EDMABA | ethyl dimethylamino benzoate | | |
| Escorez 5300 | | hydrogenated hydrocarbon resin | Exxon Mobil | Houston, TX |
| Indopol H-100 | | polybutene resin plasticizer | Innovene | Naperville, IL |
| Indopol H-300 | | " | " | " |
| Indopol H-1900 | | " | " | " |
| I6-B | | red carbonless coloring agent | | |
| Jayflex DIOP | | di-isooctyl phthalate | Exxon Mobil | Houston, TX |
| Joncryl 1680 | | RC acrylic emulsion | Johnson Polymer | Sturtevant, WI |
| Joncryl 3050 | | styrene acrylic latex emulsion | " | " |
| K-702 | | polyacrylic acid/butyl acrylate (~6%) copolymer | Noveon | Cleveland, OH |
| KXP 312 | | polyacrylic acid (~60K MW) | " | " |
| Luperox A-75 (75% BPO) | | benzoyl peroxide wetted with water | Arkema, Inc. | Philadelphia, PA |
| Luperox A-75FP (75% BPO) | | USP hydrous benzoyl peroxide | " | " |
| Luperox P | t-BPB | t-butyl peroxybenzoate | " | " |
| | MEHQ | methyl ethyl hydroquinone | | |
| Norpar 12 | | aliphatic hydrocarboin fluid | Exxon Mobil | Houston, TX |
| Norsolene A-110 | | aliphatic modified C-9 hydrocarbon resin | Sartomer Company | Eaton, PA |

TABLE 1-continued

Materials Guide

| Tradename | Acronym | Chemical Description | Source Company | |
|---|---|---|---|---|
| Norsolene A-90 | | " | " | " |
| Norsolene S-105 | | aromatic hydrocarbon resin | " | " |
| Norsolene S-85 | | " | " | " |
| | PHZBSA | para-hydrazinobenzene sulfonic acid | | |
| | PHBSA | para-hydroxybenzene sulfonic acid | | |
| | PVA | polyvinylalcohol | | |
| SR213 | BDDA | 1,4-butanediol diacrylate | " | " |
| SR238 | HDDA | 1,6-hexanediol diacrylate | " | " |
| SR256 | EEEA | 2-(2-ethoxyethoxy)-ethyl acrylate | " | " |
| SR257 | SA | stearyl acrylate | " | " |
| SR295 | PETTA | pentaerythritol tetraacrylate | " | " |
| SR351 | TMPTA | trimethylolpropane triacrylate | " | " |
| | TMPTA/I6-B | 1% I6-B in SR351 | | |
| SR355 | DTMPTTA | di-trimethylolpropane tetraacrylate | " | " |
| SR 395 | IDA | isodecyl acrylate | | |
| SR399 | DPEPA | dipentaerythritol pentaacrylate | " | " |
| SR440 | IOA | iso-octyl acrylate | " | " |
| SR444 | PETA | pentaerythritol triacrylate | " | " |
| SR495 | CLA | caprolactone acrylate | " | " |
| SR506 | IBA | isobornyl acrylate | " | " |
| SR604 | PPGMMA | polypropylene glycol monomethacrylate | " | " |
| Sarcure SR1135 | | photoinitiator | " | " |
| Sylvares ZT105LT | | styrenated terpene resin | Arizona Chemical | Jacksonville, FL |
| Sylvalite RE 105L | | resin ester tackifier | " | |
| Tinuvin 234 | | benztriazole UV absorber | Ciba Specialty Chemica | Tarrytown, NY |
| Tinuvin 328 | | " | " | " |
| TT-615 | | polyacrylate | Rohm & Haas | Philadelphia, PA |
| Vazo 52 | | 2,2'-azobis(2,4-dimethyl valeronitrile) | DuPont | Wilmington, DE |
| Wingtak 10 | | liquid hydrocarbon tackifier | Goodyear Chemical | Beaumont, TX |

Encapsulated Curative Complex

The key component of the pre-applied adhesives used in the practice of the present invention, the encapsulated curative complexes (hereinafter also referred to as "ECC"s), were made in a multi-step process which involved the preparation of the internal phase of the ECC microcapsules, i.e., the carrier material or, if the carrier were to be polymerized in-situ, the precursors therefore and the curative contained therein, followed by one or more wall forming or encapsulation steps. Generally speaking, the internal phase was prepared by adding the plasticizers, polymeric thickeners and/or tackifier resins to the polymerizable monomer in an appropriate vessel or beaker and stirring the combination at room temperature until all solids were dissolved in the monomer. Thereafter, the more thermally sensitive components, especially the curatives to be incorporated into the carrier, e.g., the peroxide and azo initiators, were then added to the mixture under constant agitation or mixing and at an elevated temperature, generally 45° C., until all solids were fully dissolved, or substantially so. The first mixing step was performed at room temperature as dissolving the resin in the monomer does not appear to be temperature dependent and is quite lengthy. On the other hand, the mixing of the curatives is more temperature dependent and, thus, here the elevated temperature is preferred. Of course, one could add all ingredients at an elevated temperature and in a different sequence; however, due to the slow rate at which the resins dissolve in the monomer, such higher temperatures for extended periods may adversely affect the potency or efficacy of the curatives.

Encapsulation of the ECC internal phase was accomplished by a one-, two- or three-phase, multi-step process, preferably, the two-phase, multi-step process. Unless otherwise indicated, all encapsulation processes were conducted in a jacketed steel vessel or reactor under a nitrogen blanket having integrated agitation means for ensuring good mixing of the components therein.

The two-phase encapsulation process involved the following general steps:

An intimate mixture of a colloidal polyacrylic acid (C-121 . . . ), sodium hydroxide (5% solution) and water was prepared in the reaction vessel.

Thereafter a partially methylated methylol melamine resin solution (Cymel 385) was added to the above mixture under constant agitation. Due to the high viscosity of this material, its addition was typically accomplished over a four-minute period.

Following completion of the addition of the melamine resin, the ECC internal phase material was then added to the mixture under constant agitation.

Once the ECC internal phase material was intimately mixed in, generally after about 16 minutes or so, the reaction mix was subjected to high shear conditions at room temperature or, preferably, at a slightly elevated temperature to achieve the desired particle size for the droplets of the ECC internal phase material. High shear or emulsification conditions were achieved by the use of an integrated or inserted impeller mechanism. Particle size determinations were made periodically to assess the progress of the emulsification.

Shortly before the completion of the emulsification process, generally about five minutes before, the wall forming composition for the second phase encapsulation process was prepared. As before, the second phase wall forming composition was prepared by adding the partially methylated methylol melamine resin to a mixture comprising the colloidal polyacrylic acid, sodium hydroxide and water.

Approximately five minutes following cessation of the emulsification process, the prepared second phase wall forming composition was added to the mixture, which, all the while, is maintained under constant agitation.

Following the addition of the second phase wall forming composition a salt, preferably sodium sulfate, was then added to the mixture to complete the encapsulation process.

Thereafter, the temperature of the reaction mix was gradually elevated to the desired reaction temperature over a period of about two hours or less, preferably about an hour or less, and maintained at the elevated temperature for an extended period of time to ensure complete formation of the capsule walls as well as polymerization of the ECC internal phase materials.

Obviously, the foregoing sequence is but one of many that could be applied to the practice of the present invention and those skilled in the art will readily recognize that many modifications and variations thereto could also be employed successfully. For example, the wall forming material and the ECC internal phase materials could be added concurrently or in reverse sequence. However, the specified sequence is especially desirable as it is believed that the wall forming material may aid in the emulsification process of the internal phase materials. Furthermore, the timing of the emulsification process will vary depending upon a number of factors including the type, size and shape of the impeller blade itself, and the speed of the same. While higher shear provides for smaller particle size, those skilled in the art will readily recognize that after a given point in time, continued high shear mixing will not lead to any further material change in particle size. Particle size determinations were made during and following the encapsulation process using an Accusizer model 780 particle size instrument made by Particle Sizing Systems.

Table 2 sets forth the specific formulations of the internal phase and the shell or capsule walls for each of the ECCs employed in the following examples of the present application: all amounts are presented in grams. In each of these examples the carrier of the internal phase was polymerized in-situ concurrent with or following encapsulation. With the exception of ECC 6, the ECC microcapsules were prepared in accordance with the aforementioned two-phase encapsulation process using the cell wall forming materials of Table 2 under the reaction conditions and times of Table 3. In the case of ECC 6, the shell/in-situ formed carrier was formed by a two-stage polymerization wherein the initial stage was conducted at 65° C. for a period of 6 hours, following which the temperature was elevated to 80° C. and the reaction continued for another 6 hour

TABLE 2

|  | ECC No. | | | | | | | | |
| --- | --- | --- | --- | --- | --- | --- | --- | --- | --- |
|  | 1 | 2 | 3 | 4 | 5 | 6 | 7 | 8 | 9 |
| ECC Internal Phase | | | | | | | | | |
| Iso-decyl acrylate |  |  |  |  |  |  |  | 60 | 61.5 |
| iso-octyl acrylate | 123 | 291.8 | 62.5 | 107.2 | 401.9 | 103 | 88.5 |  |  |
| Iso-butyl acrylate |  |  |  |  |  |  |  | 15 | 15 |
| PPGMMA |  | 145.9 | 50 | 15 | 58.2 | 14.6 | 15 |  |  |
| stearyl acrylate |  | 145.9 | 37.5 |  |  |  |  | 15 | 15 |
| caprolactone acrylate |  |  |  |  |  |  |  | 15 | 15 |
| TMPTA | 2.5 | 1.16 |  | 4.5 | 8.12 | 2.04 | 2.1 |  |  |
| CN 307 |  |  |  |  |  |  |  | 6 | 4.5 |
| ion exchange resin |  | 20 |  |  | 20 |  |  |  |  |
| triacetin |  |  |  |  |  |  | 15 |  |  |
| Sylvares ZT105LT | 125 |  |  |  |  |  |  |  |  |
| Norsolene A-110 |  |  | 100 |  |  |  |  | 148.5 | 148.5 |
| Norsolene S-105 |  | 400 |  | 103 | 400 | 100 | 103.5 |  |  |
| Indopol H-300 |  |  |  |  |  | 116.5 | 29.1 | 30 |  |
| di(iso-octyl) phthalate |  |  |  |  |  | 30 |  |  |  |
| Luperox A-75 (75% BPO) |  | 40 | 33.3 | 10.3 | 40 |  | 18 |  |  |
| Luperox A-75FP (75% BPO) |  |  |  |  |  |  |  | 10.5 | 10.5 |
| benzoyl peroxide | 4 |  |  |  |  |  |  |  |  |
| Luperox P |  |  |  |  |  |  | 27 | 30 | 30 |
| cumen hydroperoxide |  | 120 |  | 60 | 120 |  |  |  |  |
| Vazo 52 |  |  |  |  |  | 9.76 |  |  |  |
| EDMAB |  |  |  |  |  | 2.33 |  |  |  |
| total wt. (grams) | 254 | 1165 | 283.3 | 300 | 1165 | 291 | 299.1 |  |  |
| Cell wall Phase I | | | | | | | | | |
| Cymel 385* | 4 | 40 | 6 | 10 | 40 | 10 | 10 | 4.6 | 4.1 |
| C-121 | 5 | 88 | 7 | 22 | 88 | 22 | 23 |  |  |
| KXP 213 |  |  |  |  |  |  |  | 15.6 | 15.6 |
| sodium hydroxide (5%) | 2 | 80 | 5.5 | 11 | 80 | 20 | 12.5 |  |  |
| sodium hydroxide (20%) |  |  |  |  |  |  |  | 7.3 | 7.5 |
| sodium sulfate |  |  |  |  | 32 |  |  |  |  |
| water | 163 | 100 | 250 | 275 | 1000 | 275 | 275 | 185 | 185 |
| Cell wall Phase II | | | | | | | | | |
| Cymel 385 | 24 | 100 | 16 | 25 | 100 | 25 | 25 | 22.1 | 23.1 |
| C-121 | 5 | 20 | 7 | 5 | 20 | 5 | 5 |  |  |
| KXP 213 |  |  |  |  |  |  |  | 5.6 | 5.1 |
| sodium hydroxide (5%) | 0.5 |  | 2.5 | 1 |  |  | 0.8 |  |  |
| sodium hydroxide (20%) |  |  |  |  |  |  |  | 1.8 | 1.8 |
| sodium sulfate | 3 | 32 | 4 | 8 |  | 8 | 8 |  |  |
| water | 300 | 280 | 50 | 100 | 200 | 100 | 100 | 55 | 55 |

TABLE 3

|  | Example | | | | | | | |
| --- | --- | --- | --- | --- | --- | --- | --- | --- |
|  | 1 | 2 | 3 | 4 | 5 | 6 | 8 | 9 |
| Milling | | | | | | | | |
| temp (° C.) | 25 | 45 | 45 | 45 | 45 | 25 | 45 | 45 |
| Time (min) | 75 | 15 | 75 | 17 | 35 | 25 | 20 | 20 |
| Rate (rpm) | 1100 | 1800 | 2000 | 2250 | 1750 | 2400 | 2950 | 2950 |
| Ramp up of Reaction | | | | | | | | |
| initial temp (° C.) | 25 | 45 | 45 | 45 | 45 | 25 | | |
| end temp (° C.) | 90 | 68 | 65 | 68 | 65 | 65 | | |
| time (hrs)** | 2 | | | | | | | |
| Reacting | | | | | | | | |
| temp (° C.) | 90 | 68 | 65 | 68 | 65 | 65 | 68 | 68 |
| time (hrs) | 16 | 8 | 8 | 8 | 8 | 6 | 8 | 8 |
| Secondary Reaction | | | | | | | | |
| temp (° C.) | | | | | | 80 | | |
| time (hrs) | | | | | | 6 | | |
| Average microcapsule size (microns) | 47 | 13 | 18 | 29 | 19.5 | 32 | 31 | 31 |
| weight percent cell wall | 7.9 | 8.4 | 5.9 | 8.2 | XX | 8.4 | | |

**unless indicated, generally about 1 hour or less.

period. Table 3 also sets forth the physical attributes, namely the average particle size and cell wall content, of the microcapsules formed.

Encapsulated Curable Material

The second component of the pre-applied adhesives used in the examples of the present invention is the encapsulated curable material (hereinafter also referred to as "ECM's). The ECMs were prepared according to the following general process:

- the components for the ECM internal phase were mixed under nitrogen blanket until all components were dissolved and held for subsequent use;
- all components of the cell wall phase 1, excluding the melamine resin, were added to a steel reactor at 25° C. and mixed under low shear, i.e., 300 rpm; thereafter the melamine resin was added and mixed at low shear for an additional 4 minutes.
- the prepared ECM internal phase formulation was then added to the reactor and intimately mixed at 300 rpm for an additional 16 minutes;
- the mixture was then subjected to high shear emulsification of 3000 rpm at 25° C. for 75 minutes. During this time, the second phase wall forming materials were prepared with the melamine being added to the remaining components of the second phase wall composition about five minutes prior to the completion of the emulsification step of the aforementioned reactor mix;
- once the emulsification was completed, the mixture in the reactor was continually mixed with a flat paddle mixer at low shear, i.e., 300 rpm,
- approximately five minutes following cessation of the emulsification step, the second wall forming composition was added to the mixture followed by the sodium sulfate, if used;
- thereafter, the reactor temperature was gradually raised to 65° C. over about two hours and the reaction mix maintained at 65° C. with low shear mixing for an additional 8 hours before the ECM microcapsules were recovered.

Table 4 sets forth the specific formulations of the internal phase, i.e., the curable material, and the shell or capsule walls for each of the ECMs employed in the following examples: all amounts are presented in grams. With the exception of ECM I and ECM L, these ECM microcapsules were prepared in accordance with the aforementioned two-phase encapsulation process using the cell wall forming materials of Table 4 under the above-mentioned reaction conditions. In the case of ECM I, the cell wall was formed by a three-phase process. In the case of ECM L, the mixture of the wall forming materials and the

TABLE 4

|  | ECM microcapsule | | | | | | | | | | | |
| --- | --- | --- | --- | --- | --- | --- | --- | --- | --- | --- | --- | --- |
|  | A | B | C | D | E | F | G | H | I | J | K | L |
| ECM Internal Phase | | | | | | | | | | | | |
| butyl ferrocene |  | 5 | 25 | 5 |  |  |  |  |  |  |  |  |
| Ferrocene |  |  |  |  | 10 | 50 | 10 | 10 |  | 10 |  |  |
| TMPTA | 245 |  |  |  |  | 1100 |  |  |  | 212.5 |  |  |
| DTMPTTA |  |  |  | 220 |  |  |  |  |  |  |  |  |

TABLE 4-continued

| | ECM microcapsule | | | | | | | | | | | |
|---|---|---|---|---|---|---|---|---|---|---|---|---|
| | A | B | C | D | E | F | G | H | I | J | K | L |
| PPGMMA | | | 25 | 12.5 | 62.5 | 12.5 | 12.5 | 12.5 | 12.5 | | 12.5 | |
| PETTA | | | | | | 220 | | | | | | |
| PETA | | | | | | | 220 | 228.13 | | 268.5 | 233.75 | 117 |
| TMPTA/I6-B | | 1212.5 | 217.5 | | | | | | | | | |
| CN 104 | | | | | | | | | | | | 180 |
| MEHQ | | 125 | 2.5 | | | | | | | | | |
| EHDMAB | | | | | | | | 1.88 | | | | |
| EDMAB | | | | | | | | | | | | 3 |
| CHP | | | | | | | | | | 30 | | |
| PHBSA | | | | | | | | | | 1.5 | | |
| tetramethyl analine | | | | | | | | | | | 3.75 | |
| Disparlon 6650 | | | | | | | | | 7.5 | | | |
| Tinuvin 234 | | | | 3.75 | 18.75 | 3.75 | 3.75 | 3.75 | 3.75 | | | |
| Tinuvin 328 | | | | 3.75 | 18.75 | 3.75 | 3.75 | 3.75 | 3.75 | | | |
| Cell wall Phase I | | | | | | | | | | | | |
| Cymel 385* | 4 | 70 | 14 | 14 | 70 | 14 | 14 | 14 | 14 | 16.34 | 14 | 14 |
| C-121 | 5 | 25 | 5 | 5 | 25 | 5 | 5 | 7.5 | 30 | | | 5.2 |
| K-702 | | | | | | | | | | 25.65 | 5 | |
| sodium hydroxide (5%) | 2.5 | 1100 | 2.25 | 2.25 | 11.25 | 2.25 | 2.25 | 3.85 | 17.1 | | | |
| sodium hydroxide (20%) | | | | | | | | | | 8.19 | 1.5 | 1.5 |
| sodium sulfate | | | | 3 | | 3 | | 3 | | 5 | | |
| Water | 163 | 815 | 163 | 163 | 815 | 163 | 163 | 163 | 275 | 291.75 | 163 | 175 |
| Cell wall Phase II | | | | | | | | | | | | |
| Cymel 385 | 24 | 70 | 14 | 14 | 70 | 14 | 14 | 14 | 14 | 16.34 | | 14.1 |
| C-121 | 5 | 25 | 3 | 5 | 25 | 5 | 5 | 5 | 5 | | | |
| K-702 | | | | | | | | | | 5.84 | 5 | 5.3 |
| sodium hydroxide (5%) | 1.57 | 5 | 1 | 1 | 5 | 1 | 1 | 0.85 | 0.8 | | | |
| sodium hydroxide (20%) | | | | | | | | | | 1.04 | 0.85 | 0.8 |
| sodium sulfate | 3 | 15 | 3 | | 15 | | 3 | | 3 | | 3 | |
| Water | 163 | 500 | 100 | 100 | 500 | 100 | 100 | 75 | 100 | 116.7 | 100 | 100 |
| Cell wall Phase III | | | | | | | | | | | | |
| Cymel 385 | | | | | | | | | | 22.4 | | |
| C-121 | | | | | | | | | | 8.75 | | |
| sodium hydroxide (5%) | | | | | | | | | | 0.9 | | |
| sodium sulfate | | | | | | | | | | 3 | | |
| Average microcapsule size (microns) | 5 | 12.6 | | 13.7 | 12.1 | 11.6 | 11.6 | 12.5 | 19.5 | | | 16 | internal phase were emulsified at 45° C. at 4000 rpm for 20 minutes and subsequently reacted at 68° C. for 8 hours.

Binder Composition

The final component of the pre-applied adhesive compositions employed in the examples of the present specification is the binder. Several different binder systems were employed to further demonstrate the broad concept of the present invention: three aqueous based solutions and eight 100% solids UV curable coatings. The formulations for two of the aqueous based binders and each of the UV curable binder systems are set forth in Table 5: all amounts are presented as parts by weight. These binder systems were prepared under ambient conditions using traditional mixing equipment, with care to preclude exposure to UV light in the case of the UV curable systems.

EXAMPLE 1

An aqueous based pre-applied adhesive composition was prepared by mixing together Binder B1 (6 parts total), 20 parts by weight ECM A, and 74 parts by weight ECC 1. A piece of chipboard was pretreated with a coating of a 5% solution of polyvinyl alcohol using a #16 rod. The treated surface was then coated with the adhesive composition using a #50 rod. The coating was allowed to dry and then activated manually using a razor blade by stoking the edge of the blade with hand pressure quickly across the pre-applied adhesive 10 times. The chipboard was then folded on itself and held under hand pressure for 10 seconds. The chipboard remained bonded following release of the hand pressure.

EXAMPLE 2

A second aqueous based pre-applied adhesive composition was prepared by mixing together Binder B2 (18.9 parts total), 52 parts by weight ECC 3, 14.2 parts by weight ECM B, and 14.2 parts by weight ECM C. The composition was applied as a thin film (0.006") to the clay side of clay-coated news back stock. The coating was allowed to dry and then activated manually using a razor blade by stoking the edge of the blade with hand pressure quickly across the pre-applied adhesive 10 times. The news back stock was then folded on itself using finger pressure to mimic the closure of a cereal carton flap. The news back stock remained bonded following release of the hand pressure and was found to have a strong bond when pulled apart after one minute. Fiber tear was observed upon pulling apart assemblies allowed to cure for 5 minutes and for one hour.

TABLE 5

| | Binder System | | | | | | | | | |
|---|---|---|---|---|---|---|---|---|---|---|
| | B1 | B2 | B3 | B4 | B5 | B6 | B7 | B8 | B9 | B10 |
| polyvinyl alcohol* | 2 | | | | | | | | | |
| Benzoyl peroxide* | 2 | | | | | | | | | |
| p-TSA | 2 | | | | | | | | | |
| Joncryl 3050 | | 15 | | | | | | | | |
| Sodium bicarbonate | | 3.5 | | | | | | | | |
| TT-615 polyacrylate | | 0.4 | | | | | | | | |
| Sarcure SR1135 | | | 7.5 | 7.5 | 7.5 | 7.5 | 7.5 | 7.5 | 15 | 6.3 |
| Norsolene A-110 | | | 40 | 40 | 40 | 40 | 40 | 40 | | |
| BDDA | | | | | | | | | 5 | 10.1 |
| EEEA | | | | | | | | | 10 | 6.8 |
| SA | | | 35 | 26 | 28 | 5 | 27 | 5 | | |
| TMPTA | | | 5 | | | | | | | |
| PPGMMA | | | | 10 | 10 | | 10 | | | |
| HDDA | | | | 9 | 7 | | 8 | | | |
| PETA | | | | | | | | | | |
| IBA | | | | | | 15 | | 15 | 30 | 34.8 |
| CLA | | | | | | | | 5 | | |
| CN2404 oligomer | | | 20 | 15 | 15 | | 15 | | | |
| CN551 | | | | | | 25 | | 25 | | |
| CN501 | | | | | | | | | 20 | 15.8 |
| Jayflex DIOP | | | | | | 10 | | 10 | | |
| CYM M-100 | | | | | | 5 | | | | 3.4 |
| Indopol H-100 | | | | | | | | | 10 | |
| Wingtak 10 | | | | | | | | | 10 | 19.1 |
| glyceryl tribenzoate | | | | | | | | | 7.5 | |
| Norpar 12 | | | | | | | | | 7.5 | 10 |

*added as a total of 4 parts of an aqueous solution containing 5% by weight of each additive

EXAMPLES 3-11

A series of pre-applied adhesive compositions in UV curable binders were also prepared for evaluation in the practice of the present invention. The make-up of these pre-applied compositions were as set forth in Table 6, with the composition of the encapsulated curable material (ECM) as set forth in Table 4, the composition of specific binder system as set forth in Table 5 and the selection of the encapsulated curative complex (ECC) as set forth in Table 2: all amounts in Table 6 are set forth in weight percents.

In each of these examples, the adhesive composition was applied as a thin film strip, 0.5" wide by 0.006" thick along the centerline of the major axis of 3" wide by 5" long cards cut from paperboard cereal box stock. The adhesive was applied to the fiber side of the cards and cured under UV light. The adhesive was activated and the card bonded to a like card using a custom-made activator apparatus as described in co-filed US patent application of John Lazar et. al. entitled "Activator Means for Pre-Applied Adhesives," the contents of which are hereby incorporated herein by reference. The apparatus comprised an insertion station, an activator station and a bonding station with a rail extending from the insertion station, through the activation station and ending at the bonding station and a sled movable along the rail. In testing the prepared samples, a card with the adhesive pre-applied thereto is set on a sled, which is equipped with a vacuum, adhesive side up, with the major axis parallel with that of the rail. The sled then traverses along the rail at a rate of between 150 and 250 feet per minute, through the activator station where a stationary activator means having a face with one or more ridges, dams, or other structures which lift/scrape the adhesive from the card, thereby fracturing the microcapsules and mixing the contents thereof, and redeposit the activated adhesive on the card. The sled then traverses to the bonding station where a matching card is mated with the activated card at a pressure of about 5 psi applied for about 2 seconds. The bonded card assemblies were then allowed to sit for four weeks following which the ultimate peel adhesion and ultimate shear adhesion of each were determined. Tests were performed on five assemblies of each adhesive system and the results averaged and presented on Table 6.

TABLE 6

| | Example | | | | | | | | |
|---|---|---|---|---|---|---|---|---|---|
| Composition | 3 | 4 | 5 | 6 | 7 | 8 | 9 | 10 | 11 |
| Binder B3 | 43 | 43 | | 43 | | | | | |
| Binder B4 | | | 43 | | | | | | |
| Binder B5 | | | | | 43 | | | | |
| Binder B6 | | | | | | 43 | | | |
| Binder B7 | | | | | | | 43 | | |
| Binder B8 | | | | | | | | 43 | |
| Binder B10 | | | | | | | | | 51 |
| ECC Cap 2 | 37 | 32 | 37 | 37 | 37 | | | | |
| ECC Cap 4 | | | | | | | 37 | | |
| ECC Cap 5 | | | | | | | | 32 | |

TABLE 6-continued

| Composition | Example | | | | | | | | |
|---|---|---|---|---|---|---|---|---|---|
| | 3 | 4 | 5 | 6 | 7 | 8 | 9 | 10 | 11 |
| ECC Cap 6 | | | | | | | | 37 | |
| ECC Cap 8 | | | | | | | | | 33.32 |
| ECM Cap D | | | | | 20 | | | | |
| ECM Cap E | | | 20 | | | | | | |
| ECM Cap F | | | | 25 | | | | | |
| ECM Cap G | 20 | 25 | | | | | | | |
| ECM Cap H | | | | | | 20 | | | |
| ECM Cap I | | | | | | | 25 | | |
| ECM Cap J | | | | | | | | 20 | |
| ECM Cap L | | | | | | | | | 15.68 |
| Peel Adhesion (lbs) | 4.4 | 4.4 | 3.5 | 3.5 | 3.74 | 4.9 | 3.5 | 4.9 | 4.2 |
| Shear Adhesion (lbs) | 101.1 | 93.4 | 46 | 87.5 | 50.6 | 70.7 | 45.3 | 48.7 | 55.0 |

Peel Adhesion and Shear Adhesion tests were performed under Tappi conditions using a Thwing-Albert EJA materials Tensile Tester with a 200 pound load cell. Instrument settings were as follows: test speed—12 inches per minute, sensitivity—0.5 pounds and gage length—1.75 inches. For testing, each sample was placed in a clamp, a modified vise grip, whose jaws extended the length of the card and overlaid the bond area, parallel to the bond, so as to stabilize the bond area prior to testing. The clamp was tensioned to provide an interference fit, but not pressure on the bondline. The clamped assemblies were then folded to prepare to the specific tests as follows:

Peel Test: For conducting the peel test, the exposed, unbonded "flaps" of the assembled cards extending from the clamp were folded back along the clamp edge, in opposite directions, and 90° to the assembled card in the clamp. An end view of the so folded card would give the image of a "T". The assembly is then centered in the jaws of the tensile tester, with each flap in opposing jaws. The assembly was then ready for testing.

Shear Test: For conducting the shear test, a corner of one of the exposed, unbonded "flaps" of the assembled cards was dog-eared and folded 90° to the card assembly: this produced a triangular dog ear on the card. A similar dog ear was then formed on the other card at the opposite end of the card assembly with that dog ear extending 90° to the card assembly, in the opposite direction of the first dog ear. Each jaw of the tensile tester was then attached to one of the dog ears. The assembly was then ready for testing.

EXAMPLE 12

A pre-applied adhesive composition was prepared to demonstrate the efficacy of the compositions of the present invention in fastener thread locking applications. In this case, a composition was prepared using 23 parts by weight of Binder B9 from Table 5, 20 parts by weight ECM K from table 4 and 57 parts by weight ECC 7 from Table 2.

In order to test the efficacy of these compositions a 0.5" wide circumferential band of the adhesive composition was applied to the threads of a plurality of ½" long, ¼" diameter bolts. The coating was cured under UV light. Nuts were then threaded onto the bolts by hand until the nut advanced to the upper edge of the adhesive band. The assemblies were then allowed to set for several hours after which efforts to remove the nuts by hand were unsuccessful. Though the actual bond strengths were not measured, it is clear that the adhesive composition cured and formed an effective bond.

EXAMPLE 13

A pre-applied adhesive composition was prepared comprising 30% by weight of ECC 9, 60% by weight ECM L and 10% of a latex binder, Joncryl 1680. The formulation was applied to the lengthwise centerline of a 3 inch by 5 inch aluminum plates as a ½ inch wide strip of 6 mil thickness. The coating was dried using a hot air gun to expedite evaporation of the aqueous solvent and activated using the lab activator of Examples 3-11 having a configuration which provided two beads of activated adhesive. Once activated, a second aluminum plate of the same size was laid on the adhesive beads of the first plate with moderate hand pressure. The adhesive was allowed to cure, about two days, and the two plates were found to be bonded together.

EXAMPLE 14

The pre-applied adhesive of Example 13 was applied to the threads of a ⅜ inch diameter pipe by dipping. Excess adhesive material was removed and the remaining adhesive dried using a hot air gun. A pipe end cap was then manually threaded onto the threaded pipe end containing the pre-applied adhesive and tightened until the pipe and cap moved together. The assembly was then allowed to stand for about two days. Following cure, the pipe cap was not able to be removed without considerable force.

EXAMPLE 15

To demonstrate retaining type applications, a steel plate, approximately ¾ inch thick, was prepared by drilling 6 drilled holes, each about ½ inch in diameter. Steel pegs of nearly the same diameter were also prepared. These pegs had a slight push fit with the holes but rotated freely therein upon manual turning. The pegs were then dipped in the adhesive coating of Example 13, the excess coating was removed, and then the coating dried using a hot air gun. The pegs with the dried pre-applied adhesive were then inserted into the drilled holes and rotated one full rotation or less. Resistance was felt upon rotation. The pegs were allowed to stand for several days following which it was found that the pegs could only be turned with increased manual effort. One peg was only able to turn with the use of a torque wrench.

EXAMPLE 16

To demonstrate the applicability of the present invention to plastic surfaces, a pre-applied coating composition comprising 60% by weight ECC 9, 30% by weight ECM L and 10% latex binder, Joncryl 1680, was applied as a ½ inch wide strip of 6 mil thickness to a rectangular cut-out of a Tyvek® polyethylene envelope measuring approximately 8 inches wide by 5 inches long. The adhesive was applied along the length about 2 inches from one edge. The adhesive was dried using a hot air gun and subsequently activated using the activator means of Examples 3-11 resulting in two beads of activated adhesive. Once activated the rectangular cut out was then folded upon itself, lengthwise, forming essentially a 4 inch by 5 inch rectangle. Finger pressure was then applied along the bond line for a few seconds to ensure good contact between the mated surfaces. The adhesive was allowed to cure and a bond was found to have formed.

While the present invention has been described with respect to aforementioned specific embodiments and examples, it should be appreciated that other embodiments utilizing the concept of the present invention are possible without departing from the scope of the invention. The present invention is defined by the claimed elements and any and all modifications, variations, or equivalents that fall within the spirit and scope of the underlying principles embraced or embodied thereby.

We claim:

1. A stock material for use in the assembly of apparatuses, devices or articles of manufacture which stock material is in a finished or semi-finished state and has one or more surfaces that are to be bonded or fastened to itself or other components of the apparatus, device or article of manufacture during the assembly thereof wherein at least a portion of said one or more surfaces has applied thereto a substantially dry-to-the-touch, pre-applied, curable adhesive composition comprising an encapsulated liquid curable material and a separately encapsulated curative complex, said curative complex being encased in a polymer capsule and comprising an in-situ formed carrier material and an effective amount of a curative or combination of curatives contained in the carrier material and capable of effecting, directly or indirectly, the cure of the aforementioned liquid curable material, said carrier material being a natural or synthetic material or composition that is substantially non-flowing in the absence of external forces, elevated temperatures or both impacting upon said curative complex wherein the in-situ formed carrier material is formed concurrent with or subsequent to the encapsulation of the curative complex by the action of a curative with or on a precursor composition for said carrier material and either (i) the curative for the in-situ formed carrier material is different from and in addition to the curative contained in said carrier material or (ii) the curative for the in-situ polymerized carrier material is the same as the curative contained in the carrier and the amount of the curative prior to in-situ polymerization of the carrier material is at least 1.6 weight % based on the weight of the carrier material and the amount of curative remaining after polymerization of the carrier material is effective for effecting cure of the liquid curable material.

2. The stock material of claim 1 wherein the stock material has one or more surfaces or portions thereof which are threaded and the pre-applied curable adhesive covers at least a portion of said threaded surface or surfaces.

3. The stock material of claim 2 wherein the stock material is threaded fastener.

4. The stock material of claim 3 wherein the threaded fastener is selected from the group consisting of screws, bolts, nuts, eyehooks, eyebolts, and wing nuts.

5. The stock material of claim 2 wherein the stock material is a component of a conduit.

6. The stock material of claim 5 wherein the conduit component is selected from the group consisting of pipes, tubes, end caps, spigots, valves, and connectors.

7. The stock material of claim 2 wherein the stock material is a device having a threaded element associated therewith for attaching the device to a larger apparatus or structure.

8. The stock material of claim 7 wherein the stock material is selected from the group consisting of solenoids, filters, valves, pressure gauges and sensors.

9. The stock material of claim 1 wherein the stock material (a) is to be employed in a retaining or blind hole bonding application in which the piston of a male connector is inserted into or through the blind hole or keyway of a female connector and (b) has at least one male connector or female connector or both wherein the pre-applied adhesive is within the blind hole or keyway of the female connector or applied to that portion of the piston of the male connector that, in the assembled state, is bonded to the female connector.

10. The stock material of claim 9 wherein the stock material is selected from shafts, dowels, engine core plugs, press-fit caps, rotors, sprockets, hubs, and bearings.

11. The stock material of claim 1 wherein the one or more surfaces to be bonded are substantially planar and capable of being acted upon manually or by automation in order to sufficiently activate the pre-applied adhesive before mating of the surface.

12. The stock material of claim 11 wherein the stock material is selected from the group consisting of magnets, trim, motor mounts, and housing panels.

13. The stock material of claim 1 wherein the carrier material is (a) of a soft, putty-like or gel-like character or (b) a solid or semi-solid that is (i) soluble in the liquid curable material, (ii) softened by the liquid curable material, (iii) softened by the reaction conditions under which the liquid curable material is cured, (iv) softened by the environmental conditions under which the liquid curable material is cured, (v) softened by the method or process by which the curative is to be made available to other components of the curable adhesive composition, (vi) rendered flowable by the liquid curable material, (vii) rendered flowable by the reaction conditions under which the liquid curable material is cured, (viii) rendered flowable by the environmental conditions under which liquid curable material is cured, or (ix) rendered flowable by the method or process by which the curative is to be made available to other components of the curable adhesive composition.

14. The stock material of claim 1 wherein the carrier material is of a soft putty-like or gel-like character and comprises a thixotropic or thickened composition of one or more monomers, oligomers or pre-polymers, or combinations thereof, which composition is substantially non-reactive with the curative in the encapsulated state.

15. The stock material of claim 1 wherein the carrier material includes or comprises one or more thixotropic agents or one or more thixotropic or non-thixotropic gelling or thickening agents that are generated in-situ or act latently concurrent with or following encapsulation of the carrier material.

16. The stock material of claim 1 wherein the carrier material is selected from the group consisting of hot melts, pressure sensitive adhesives, rubber materials, elastomer/tackifier compositions, a polymer whose Tg is less than 35° C., semi-solid and solid resins, starches and starch-based polymers, hydrogels, low temperature waxes and a thickened or gel-like mass of one or more monomers, oligomers, or prepolymers or combinations thereof.

17. The stock material of claim 1 wherein the carrier material is an adhesive or has latent adhesive properties.

18. The stock material of claim 1 wherein the carrier material does not flow or deform except when subjected to forces of at least 1 psi.

19. The stock material of claim 1 wherein the carrier material is formed in-situ concurrent with the encapsulation of the curative complex.

20. The stock material of claim 1 wherein the liquid curable material comprises one or more liquid curable monomers, oligomers, or prepolymers or combinations thereof.

21. The stock material of claim 1 wherein the liquid polymerizable material is selected from the group consisting of one or more monomers, oligomers or prepolymers or combinations thereof that undergo vinyl polymerization; unsaturated polyesters; urethanes; epoxy resins; polysulfides; isocyanates; silicones; polyethers, polyurethanes and polyolefins having silanol moieties capable of undergoing silanol condensation or hydrosilation reactions; and phenoxy resins.

22. The stock material of claim 1 wherein both the encapsulated liquid polymerizable material and the encapsulated cure system are discrete microcapsules held to the surface of the stock material by a binder material.

23. The stock material of claim 22 wherein the binder material is an adhesive or a coating material.

24. The stock material of claim 22 wherein the binder material is an actinic radiation cured composition.

25. The stock material of claim 1 wherein the encapsulation of the liquid curable material is achieved by sandwiching the liquid curable material between the surface of the stock material to which it is applied and a film of a cured coating material and wherein the encapsulated curative is present as discrete microcapsules dispersed in the liquid curable material.

26. The stock material of claim 25 wherein the cured coating material is an actinic radiation cured composition.

27. The stock material of claim 1 wherein the carrier material is formed in-situ subsequent to the encapsulation of the curative complex.

28. A substrate having a substantially dry-to-the-touch, pre-applied, curable adhesive composition comprising an encapsulated liquid curable material and a separately encapsulated curative complex, said curative complex being encased in a polymer capsule and comprising an in-situ formed carrier material and an effective amount of a curative or combination of curatives contained in the carrier material and capable of effecting, directly or indirectly, the cure of the aforementioned liquid curable material, said carrier material being a natural or synthetic material or composition that is substantially non-flowing in the absence of external forces, elevated temperatures or both impacting upon said curative complex wherein the in-situ formed carrier material is formed concurrent with or subsequent to the encapsulation of the curative complex by the action of a curative with or on a precursor composition for said carrier material and either (i) the curative for the in-situ formed carrier material is different from and in addition to the curative contained in said carrier material or (ii) the curative for the in-situ polymerized carrier material is the same as the curative contained in the carrier and the amount of the curative prior to in-situ polymerization of the carrier material is at least 1.6 weight % based on the weight of the carrier material and the amount of curative remaining after polymerization of the carrier material is effective for effecting cure of the liquid curable material.

29. The substrate of claim 28 wherein the carrier material is (a) of a soft, putty-like or gel-like character or (b) a solid or semi-solid that is (i) soluble in the liquid curable material, (ii) softened by the liquid curable material, (iii) softened by the reaction conditions under which the liquid curable material is cured, (iv) softened by the environmental conditions under which the liquid curable material is cured, (v) softened by the method or process by which the curative is to be made available to other components of the curable adhesive composition, (vi) rendered flowable by the liquid curable material, (vii) rendered flowable by the reaction conditions under which the liquid curable material is cured, (viii) rendered flowable by the environmental conditions under which liquid curable material is cured, or (ix) rendered flowable by the method or process by which the curative is to be made available to other components of the curable adhesive composition.

30. The substrate of claim 28 wherein the carrier material is of a soft putty-like or gel-like character and comprises a thixotropic or thickened composition of one or more monomers, oligomers or pre-polymers or combinations thereof, which composition is substantially non-reactive with the curative in the encapsulated state.

31. The substrate of claim 28 wherein the carrier material includes or comprises one or more thixotropic agents or one or more thixotropic or non-thixotropic gelling or thickening agents that are generated in-situ or act latently concurrent with or following encapsulation of the carrier material.

32. The substrate of claim 28 wherein the carrier material is selected from the group consisting of hot melts, pressure sensitive adhesives, rubber materials, elastomer/tackifier compositions, a polymer whose Tg is less than 35° C., semi-solid and solid resins, starches and starch-based polymers, hydrogels, low temperature waxes and a thickened or gel-like mass of one or more monomers, oligomers or prepolymers or combinations thereof.

33. The substrate of claim 28 wherein the carrier material is an adhesive or has latent adhesive properties.

34. The substrate of claim 28 wherein the carrier material does not flow or deform except when subjected to forces of at least 1 psi.

35. The substrate of claim 28 wherein the carrier material is formed in-situ concurrent with the encapsulation of the curative complex.

36. The substrate of claim 28 wherein the liquid curable material comprises one or more curable monomers, oligomers, or prepolymers or combinations thereof.

37. The substrate of claim 28 wherein the liquid curable material is selected from the group consisting of one or more monomers, oligomers, or prepolymers or combinations thereof that undergo vinyl polymerization; unsaturated polyesters; urethanes; epoxy resins; polysulfides; isocyanates; silicones; polyethers, polyurethanes and polyolefins having silanol moieties capable of undergoing silanol condensation or hydrosilation reactions; and phenoxy resins.

38. The substrate of claim 28 wherein both the encapsulated liquid polymerizable material and the encapsulated cure system are discrete microcapsules held to the surface of the substrate by a binder material.

39. The substrate of claim 28 wherein the encapsulation of the liquid curable material is achieved by sandwiching the liquid curable material between the surface of the substrate and a film of a cured coating material and wherein the encapsulated curative complex is present as discrete microcapsules dispersed in the liquid curable material.

40. The substrate of claim 28 wherein the carrier material is formed in-situ subsequent to the encapsulation of the curative complex.

* * * * *